US011238424B2

(12) United States Patent
Hajji

(10) Patent No.: US 11,238,424 B2
(45) Date of Patent: *Feb. 1, 2022

(54) METHOD OF ENHANCING POINT-OF-SALE SYSTEMS

(71) Applicant: ECREBO LIMITED, Oxfordshire (GB)

(72) Inventor: Hassan Hajji, Oxfordshire (GB)

(73) Assignee: ECREBO LIMITED, Oxfordshire (GB)

( * ) Notice: Subject to any disclaimer, the term of this patent is extended or adjusted under 35 U.S.C. 154(b) by 261 days.

This patent is subject to a terminal disclaimer.

(21) Appl. No.: 16/667,554

(22) Filed: Oct. 29, 2019

(65) Prior Publication Data

US 2020/0167749 A1 May 28, 2020

Related U.S. Application Data

(63) Continuation of application No. 15/855,497, filed on Dec. 27, 2017, now Pat. No. 10,475,013, which is a
(Continued)

(30) Foreign Application Priority Data

Jul. 14, 2011 (GB) ...................................... 1112125
Jul. 14, 2011 (GB) ...................................... 1112126
(Continued)

(51) Int. Cl.
*G06Q 20/20* (2012.01)

(52) U.S. Cl.
CPC ........... *G06Q 20/20* (2013.01); *G06Q 20/202* (2013.01)

(58) Field of Classification Search
None
See application file for complete search history.

(56) References Cited

U.S. PATENT DOCUMENTS 6,108,717 A * 8/2000 Kimura ................. G06F 9/4411
710/8
7,658,323 B2 2/2010 Kleinman et al.
(Continued)

FOREIGN PATENT DOCUMENTS

EP 0962858 A2 12/1999
EP 1727035 A2 11/2006
(Continued)

OTHER PUBLICATIONS

International Search Report dated Oct. 19, 2012 for PCT/GB2012/051689 Filed Jul. 13, 2012. pp. 1-4.
(Continued)

*Primary Examiner* — Scott A Zare

(57) ABSTRACT

A method of operating a point-of-sale (POS) system (1), the POS system comprising a POS terminal (3) having a software module (17, 21) thereon for enabling a retailer to process transactions within a transaction environment, and a peripheral device (5, 7) in communication with the POS terminal (3), the POS system (1) further comprising a driver software module (40) installed between the POS terminal (3) software module (17, 21) and the peripheral device (5, 7), the method comprising: receiving, at the driver software module (40), data sent between the software module (17, 21) and the peripheral device (5, 7) in communication with the POS terminal (3); communicating with a further device (44, 60, 64) in dependence on the data received at the driver software module (40); receiving modified data from the further device (44, 60, 64); and outputting the modified data.

35 Claims, 34 Drawing Sheets

Related U.S. Application Data continuation of application No. 14/232,701, filed as application No. PCT/GB2012/051689 on Jul. 13, 2012, now Pat. No. 9,911,109.

(30) Foreign Application Priority Data

| Jul. 14, 2011 | (GB) | ...................................... | 1112127 |
| Jul. 15, 2011 | (GB) | ...................................... | 1112245 |
| Jul. 25, 2011 | (GB) | ...................................... | 1112750 |
| Aug. 8, 2011 | (GB) | ...................................... | 1113661 |

(56) References Cited

U.S. PATENT DOCUMENTS

| 2003/0236755 | A1 | 12/2003 | Dagelet, Jr. |
| 2004/0128412 | A1 | 7/2004 | Harrison |
| 2005/0261969 | A1 | 11/2005 | Dimmock et al. |
| 2006/0261159 | A1 | 11/2006 | Redick et al. |
| 2009/0237717 | A1 | 9/2009 | Takamoto et al. |
| 2013/0262708 | A1 | 10/2013 | Mcleod |

FOREIGN PATENT DOCUMENTS

| EP | 1764680 | A2 | 3/2007 |
| JP | 2005321873 | A | 11/2005 |
| JP | 2006338443 | A | 12/2006 |
| JP | 2007018043 | A | 1/2007 |
| JP | 2009226689 | A | 10/2009 |
| JP | 2009226690 | A | 10/2009 |
| WO | 2004114056 | A2 | 12/2004 |
| WO | 2009014402 | A3 | 1/2009 |

OTHER PUBLICATIONS

International Written Opinion dated Jan. 14, 2014 for PCT/GB2012/051689 Filed Jul. 13, 2012. pp. 1-4.

International Preliminary Report on Patentability dated Jan. 14, 2014 for PCT/GB2012/051689 Filed Jul. 13, 2012. pp. 1-5.

* cited by examiner

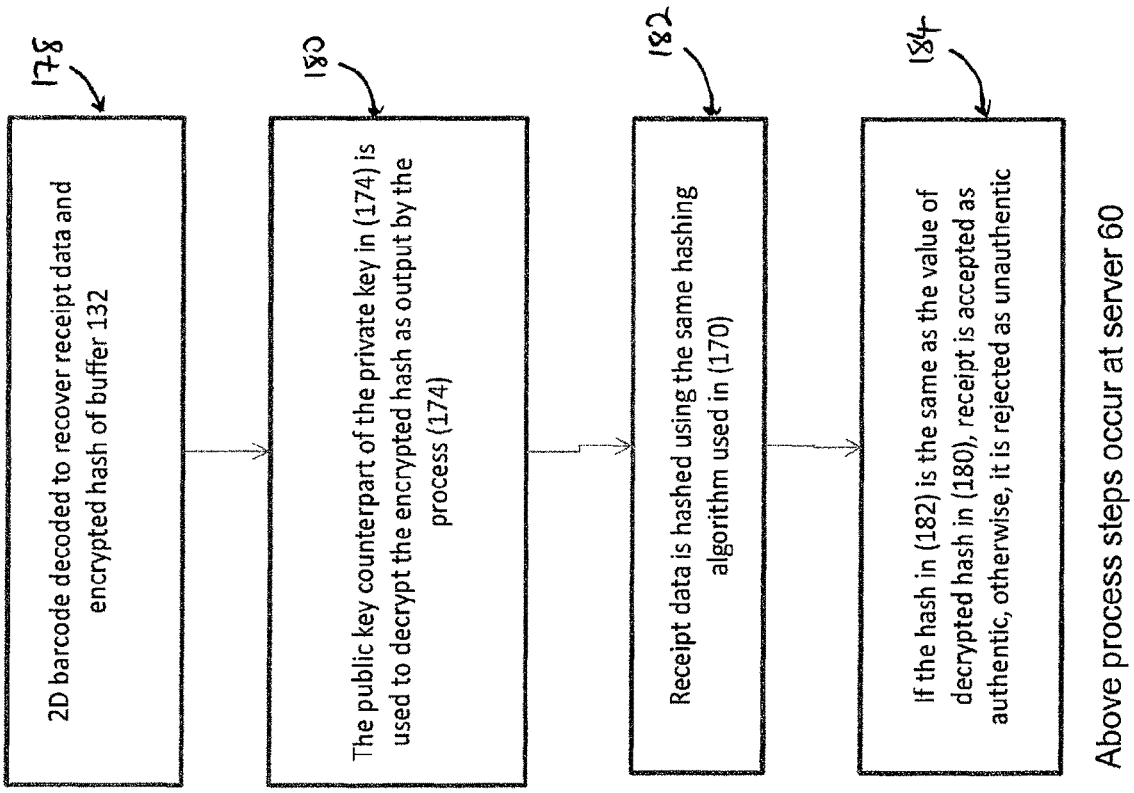
Figure 14-b
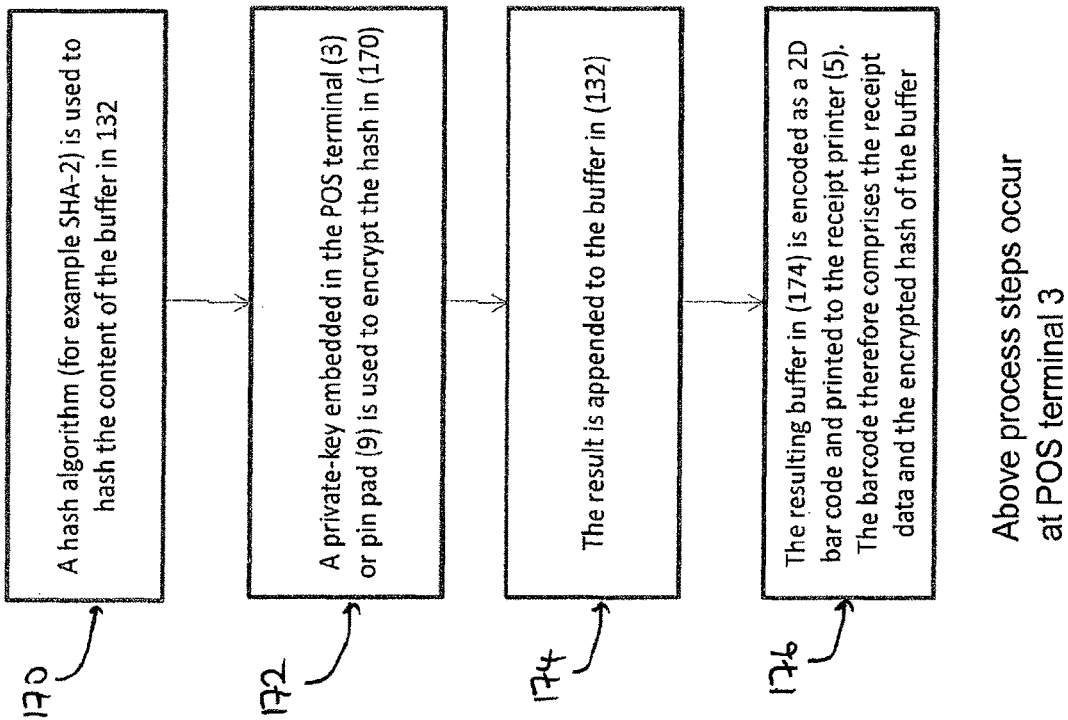
Figure 14-a

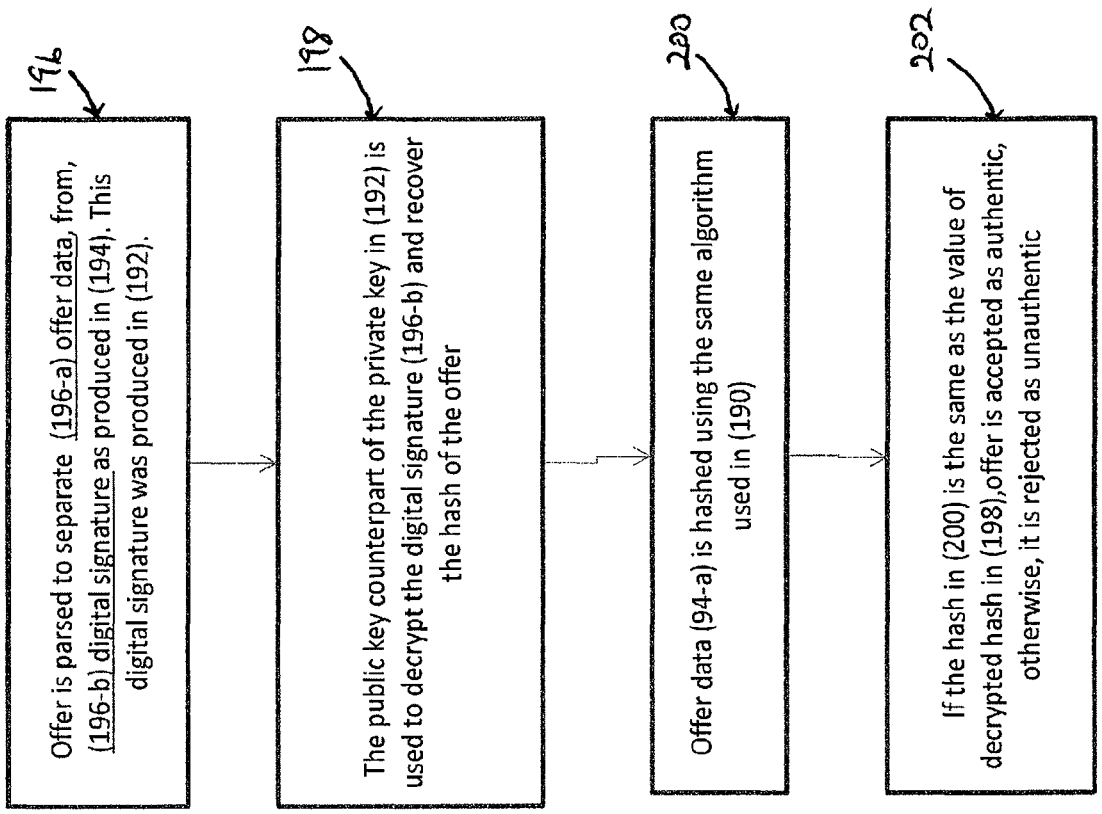
Figure 15-b – Verifying offer
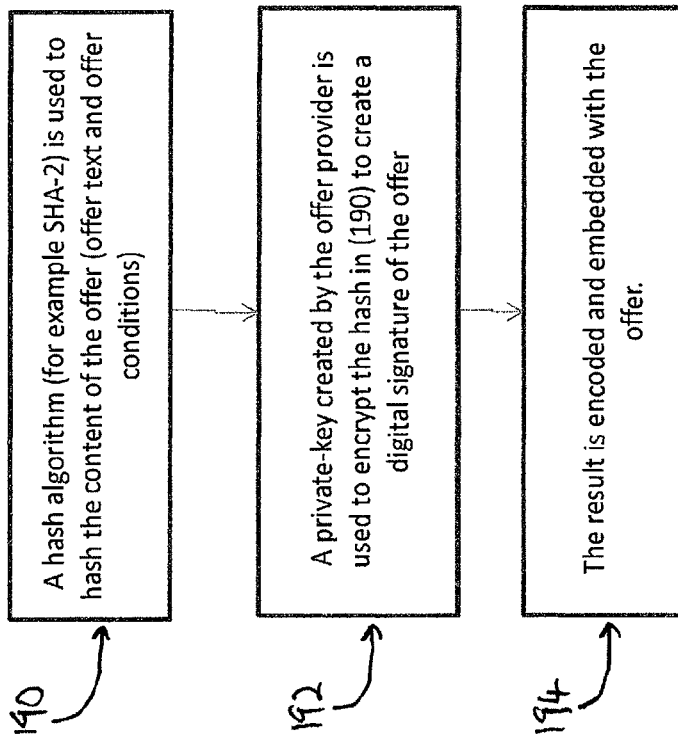
Figure 15-a – Signing Offer

340 Retailers points rules

| Retailer | Points per transaction | Points per item | | |
|---|---|---|---|---|
| | | | Item | points |
| Retailer 1 | 10 | | Item 1 | 10 |
| | | | Item 2 | 1 |
| Retailer 2 | 23 | | Item | points |
| | | | Item 1 | 24 |
| | | | Item 2 | 2 |

Figure 24

Figure 25: Retrieving offers

METHOD OF ENHANCING POINT-OF-SALE SYSTEMS

CROSS-REFERENCE TO RELATED APPLICATIONS

This application is a continuation of U.S. patent application Ser. No. 15/855,497 filed Dec. 27, 2017, now U.S. Pat. No. 10,475,013 issued on Nov. 12, 2019, entitled "METHOD OF ENHANCING POINT-OF-SALE SYSTEMS", which is a continuation of U.S. patent application Ser. No. 14/232,701, filed Mar. 11, 2014, now U.S. Pat. No. 9,911,109 issued on Mar. 6, 2018, entitled "METHOD OF ENHANCING POINT-OF-SALE SYSTEMS", which is a National Stage Entry of PCT/GB2012/051689, filed Jul. 13, 2012, which claims priority to and the benefit of: United Kingdom Patent Application No. 1113661.1, filed Aug. 8, 2011; United Kingdom Patent Application No. 1112750.3, filed Jul. 25, 2011; United Kingdom Patent Application No. 1112245.4, filed Jul. 15, 2011; United Kingdom Patent Application No. 1112127.4, filed Jul. 14, 2011; United Kingdom Patent Application No. 1112126.6, filed Jul. 14, 2011; and United Kingdom Patent Application No. 1112125.8, filed Jul. 14, 2011.

FIELD OF THE INVENTION

The present invention relates to a method of enhancing point of sale systems. In particular, the present invention relates to a method of enhancing the functionality of a point of sale system, such as that found within a retail environment, without the need to alter either the point of sale hardware or to alter the software loaded thereon.

BACKGROUND OF THE INVENTION

Retailers use point of sale hardware and software systems (POS systems) to streamline sales operations and to allow them to process sales, handle payments, and store transactions for later retrieval. POS systems generally comprise a number of elements including point of sale terminals that are connected to a controlling server (the "back-office" servers) using an internal network connection. In a large retail environment, such as a supermarket, there may be a plurality of such POS terminals in communication with the back-office servers. It is noted that the back-office servers may be located locally (e.g. within the store) or remotely (in which case the POS terminals may be in communication with the back-office servers via a local communications network and a further communications network such as the Internet).

POS systems represent a very expensive investment for retailers. Retailers choose their POS provider after a lengthy Request for Proposal (RFP) process, and once the investment is made, they upgrade it only infrequently.

Extending the functionality of POS systems has always been a challenge but the recent popularity of coupons and the proliferation of mobile phones have put tremendous pressure on retailers to look at ways at supporting these functionalities as quickly as possible. Clearly, it is always possible to redesign and develop the POS software so that it supports issuance and redemption of coupons, and integrate with mobile channels, but this option is costly and time consuming.

FIG. 1 shows a typical POS configuration for a point-of sale system 1 comprising a POS terminal 3, a receipt printer 5, a barcode scanner 7, a data entry device 9 for the entry of PIN codes (the "Pin Pad"), back-office servers 11 and a payment processing server 13. The POS terminal, back-office servers 11 and payment processing server 13 are in communication with one another via a network 15 (which may be a local network, the Internet or a mixture of both).

The POS terminal 3 comprises a point of sale application software module 17, which is in communication with a product database 19, and a payment application software module 21.

The point of sale application software module 17 and payment application software module 21 are each in communication with the receipt printer 5 and scanner 7 and with the back-office servers 11 and payment processing server 13 via the network 15.

The point of sale application software module 17 is responsible for recording items to be sold one by one, calculating the total balance, triggering any pre-configured promotions, and then accepting multiple payment methods. Typically, items are input in using the scanner 7. Items having barcodes printed on external packaging will be placed in front of the scanner 7 which then scans the barcode and passes the barcode as input to the POS software module 17. The POS software module 17 will then query the local database 19 to retrieve the price of the item which may be displayed on a screen (not shown in FIG. 1).

Once all items are scanned, the cashier asks the customer to confirm their preferred payment type to use, and if the user chooses to pay by card, the POS software module 17 connects to the payment application software module 21.

The payment application software module 21 drives an external device 9 to get the credit card details and optionally the PIN associated with the card. In cases where a PIN code is not required, the payment application software module may interface with a magnetic strip reader (which may be integrated with the device 9) which reads the card details when the user or cashier swipes the card through the strip reader.

Once the transaction is paid for, the POS application software module 17 formats details of the transaction and sends them to the receipt printer 5. In many cases, two or more receipts are printed: one for the customer, and one for the retailer. It is noted that the retailer copy of the receipt can potentially contain more information than the customer one (for e.g. full card details, while the customer receipt contains only the last 4 digits of the card used).

The payment application software module 21 is responsible for authenticating the card, verifying the PIN, and authorising the card for payment. This is done by accessing the payment processor 13 over the network connection 15. The payment processor 13 may be either hosted inside or outside the premises of the retailer, and in that case it is hosted outside the retailer's premises, the network path from the payment application software module 21 to the payment processor 13 may involve leaving the retailer's local computer network and using the Internet or other communications network (e.g. dedicated communications network or a mobile telecommunications network). The network 15 is also used by the POS application software module 17 to send transaction details to the back-office servers 11.

The POS application software module 17 typically runs on a commodity operating system (e.g. Microsoft Windows or Linux). Each of the devices external to the POS terminal 3 is connected to the machine using standard connectors: Serial, Parallel, USB, or Ethernet ports. To simplify the interoperability between POS software and payment software vendors and external devices vendors, a consortium of companies led by Microsoft, NCR, Epson, and Fujitsu-ICL standardised the interface between each device. These standards are typically implemented in Java or COM technologies, and known under the name of JAVAPOS or OPOS.

It is noted that OPOS is an implementation of an interoperability standard for a Windows® operating system using Component Object Model (COM) technology. OPOS defines a set of control objects that define the interface of each device, and a set of service objects that implement the interface above, in a set of libraries called service objects. Typically, the service object is provided by the hardware provider (e.g. Epson for the printers).

JAVAPOS is the implementation of the standard in JAVA language. It uses the same architecture as OPOS, with a set of JAVA classes defining the interface of the API, and another set of JAVA classes defining the implementation of these interfaces, called service objects. Typically, the manufactures provides the implementation for these service objects in JAVA.

FIG. 2 shows a typical layout of the component of OPOS used to interface between a physical device 23 (e.g. the printer 5 or scanner 7 of FIG. 1) and the POS application software module 17. The POS application software module 17 is arranged to access the physical device 23 using a standard OPOS application programming interface (API) 30. Communication between the POS application software module 17 and the physical hardware device 23 is handled by an OPOS device 32 (which is actually a software stack within the POS terminal 3).

The OPOS device comprises an OPOS device control module 34 which provides the interface for the POS application software module 17 and an OPOS device service module 36 which provides communication to the device 23.

The OPOS Device Service module 36 implements the details of the physical device 23 and is typically provided by the hardware vendor. For example, to print receipt data, the POS application software module 17 may call the following method:

PrintNormal(Integer Station, String DataToBePrinted):
Prints the data specified in "DataToBePrinted" to the station specified in parameter "Station". This is guaranteed to work regardless of the underlying printer attached to the POS terminal 3.

Similar APIs exist for the scanner 7 as well. For example, regardless of the scanner attached to the POS terminal 3, the scanner property called "ScanData" always holds the scanned data. The POS application software module 17 upon receiving a read event from the scanner, can read this data, and it is guaranteed to hold the barcode of the item scanned.

An arrangement mirroring that of FIG. 2 may also be used to describe a JAVAPOS system for interfacing a POS software module with a hardware device.

To access the stream of data sent by the POS application software module 17 requires a change in the application so that appropriate code can be added in order to access the data.

It is noted that retailers are looking for ways to understand their customers, to reach them through a multitude of channels, to leverage mobile phones as another channel to engage with their customers and to collect information about the experience of customers in their stores. Typically, any of these actions would require major changes to be made to POS software and hardware.

For example to be able to collect information about customers, retailers have been using loyalty cards to build profiles of customers. While popular, loyalty cards are very expensive to manage. It costs more than £6 million to just manage the IT infrastructure required for loyalty cards. Offers associated with loyalty cards often still have to be sent using postal services, which is not only costly, but needs to be carefully planned ahead of time: retailers need to know what offers to give, in what quantity. Furthermore, if an offer is not performing as expected, there is no way to correct-course during the campaign.

To reach out to customers with offers in real-time, a retailer may opt to use a second printer to print coupons at the point of sale till. However, retailers who implement this solution are required to operate a loyalty card scheme, a set of colour printers and targeting software which is very costly. A single printer of the type used by these retailers has a retail price of hundreds of pounds and, for larger environments with multiple point of sale terminals this solution is therefore very costly.

It can therefore be appreciated that modifying the standard point of sale environment is a significant undertaking requiring access to transaction data (which therefore requires the POS hardware and/or software to be modified), associating transaction data with a loyalty card, and having another piece of software print offers through a second printer.

It is therefore an object of the present invention to provide a mechanism for modifying/enhancing the functionality of a point of sale system without requiring the addition of new hardware and without requiring the modification of POS provider proprietary software modules.

SUMMARY OF THE INVENTION

According to a first aspect of the present invention there is provided a method of operating a point of sale (POS) system, the POS system comprising a POS terminal having a software module for enabling a retailer to process transactions within a transaction environment, and a peripheral device in communication with the POS terminal, the POS system further comprising a driver software module between the software module and the peripheral device, the method comprising: receiving, at the driver software module, data sent between the software module and the peripheral device in communication with the POS terminal; communicating with a further device in dependence on the data received at the driver software module; receiving modified data from the further device; and outputting the modified data.

A typical point of sale (POS) system may comprise a POS terminal which is essentially a computer, e.g. at a till point in a checkout lane in a supermarket. The POS terminal may have one or more software modules installed thereon ("a software module for enabling a retailer to process transactions within a transaction environment", also referred to as a "POS terminal software module"). For example, the POS terminal may comprise a point-of-sale application software module and a payment application software module as described above. In conventional arrangements these software modules would be in communication with one or more hardware devices such as a scanner or printer.

The software module may be proprietary to a point-of-sale software provider and as such may be a closed software component that a retailer cannot modify or alter. Similarly, the hardware device may likely be a proprietary device that the retailer cannot modify or alter easily.

It is therefore a non-trivial task, both technically and financially, to change the typical POS system set up.

The present invention however provides a mechanism for altering the functionality of the POS system by comprising a further software component, the driver software module, arranged to be installed in the data communication path between the proprietary software module(s) and the hardware devices (peripheral device). In this manner communications, e.g. from a POS application software module to a printer or from a scanner to a POS application software module, may be readily intercepted and the data either diverted, e.g. to a "further device" such as a local or remotely located server or computer, or otherwise modified. In this manner the functionality of the POS system may be enhanced without the drawbacks of previous methods. The driver software module may conveniently be located (installed) on the POS terminal.

Conveniently, the POS terminal may comprise a point of sale application software module and the data received at the driver software module may comprise transaction data. In such an instance the software module may be in communication with a database comprising details of transaction items. The POS terminal may also comprise a payment application software module and the data received at the driver software module may comprise payment data related to the transactions processed by the POS system.

Conveniently, the communicating with a further device step may comprise the driver software module sending the data received in the first receiving step (from the POS terminal software module or the peripheral device) or a portion thereof to the further device. The driver software module may forward the data it receives onto the further device (e.g. a remote server) without modification. Alternatively, it may append or prepend further information. Still further, the driver software module may only forward an extract or a processed version of the received data.

Conveniently the driver software module may receive data that has been formatted to the requirements of the peripheral device from the POS terminal software module. The modified data that is then received back from the further device may also be formatted by the further device to the requirements of the peripheral device or the modified data may be formatted by the driver software module to the requirements of the peripheral device. In this manner the peripheral device does not "see" the driver software module as from its point of view it is still receiving correctly formatted data as if it had originated from a standard POS software module.

The further device may be a remotely located server. In this manner transaction data or details relating to transaction data may be sent to a remote server where it can be processed, e.g. to validate the presence of certain transaction items within the transaction data in order to verify that the terms of an offer have been met or to provide further services, e.g. to host a loyalty scheme. This has the advantage of allowing a consumer to sign up to a loyalty scheme that is retailer independent (in other words the retailer may not be part of the scheme themselves) so that potentially any transaction a consumer makes in any retail environment can be included within the loyalty scheme.

The peripheral device may conveniently comprise a scanner or printer or other device such as a touchpad, display device etc.

Where the peripheral device is a printer, the modified data may comprise the data received from the POS terminal and a barcode that has been added by the further device. The transaction data and barcode may then be output to the printer for printing the receipt. In this manner the consumer may be provided with the means to access information related to his transaction via the barcode supplied from the further device. For example, the barcode may comprise a copy of the transaction data so that the consumer can recover a digital copy of their receipt (e.g. by reading the barcode with a suitably equipped mobile device such as an "app" on a smartphone or tablet). The barcode may also comprise an identifier for information held online (e.g. a copy of transaction at a held online at a transaction server) or for accessing a remote computing device to access further services (e.g. a loyalty scheme or for retrieving a transaction offer from a transaction server or for retrieving a questionnaire for completion by a consumer). In one embodiment the consumer may be able to access all the above functionality.

The barcode may conveniently be a two-dimensional code or QR code.

It is noted that a problem exists in a retail environment related to the mis-identification of paper based or phone based offer vouchers that are not part of the retailer's own offers (e.g. drinks offer from Coca-Cola® used at Sainsbury's®). Many vouchers are erroneously allowed by the retailer because there is no easy way of reconciling the offer (which is not on the retailer's back-office system) with the items actually bought.

In order to address this problem the driver software module may receive data from a scanner peripheral device that has scanned a voucher barcode. The barcode may then be analysed for a unique identifier and the driver software module may then communicate with a remotely located server device to validate the unique identifier. In this manner paper based vouchers that a consumer brings into a retail environment may be accurately processed as the driver software module may additionally provide details of the transaction data (received from the POS application software module) to the remote server and the remote server may be arranged to have the capability to analyse the contents of the transaction data against the scanned voucher. In this way, misclassification of vouchers in a retail environment can be avoided. It also provides a mechanism for a retailer to accept and process vouchers that are not part of its own loyalty scheme or in-house offers. The modified data received back from the further device may therefore comprise the voucher barcode and the driver module may output the modified data to the POS terminal. The driver module may also be conveniently arranged to format the modified data received from the further device to the requirements of the POS terminal.

Conveniently, and as noted above, the driver module may send details of voucher barcodes scanned at a scanner and transaction details of transactions recorded by a POS terminal to the further device such that they may be processed and verified.

The driver software module may receive transaction item data from a POS terminal and receive voucher related data from a scanner. The transaction item data and voucher related data may then be communicated to the further device to allow the presence of transactions associated with the scanned vouchers in the transaction item data to be determined in order to verify that the terms of an offer have been met.

The driver software module may conveniently be incorporated into the POS system in a number of ways.

Where the POS terminal comprises a driver stack arranged to control operation of the peripheral device, the driver software module may be arranged to be a filter driver within the driver stack.

Where the POS terminal comprises an OPOS device (an OPOS device control module and an OPOS device service module), the driver module may be located between the OPOS device control module and the OPOS device service module. In a JAVAPOS environment, the driver software module may be located between a JAVAPOS device control module and a JAVAPOS device service module. Alternatively, the driver software module may be arranged to be installed as a logical service object in a JAVAPOS or OPOS layer.

In instance where data is rasterised at a high level by a printer driver, the driver software module may comprise an API hook.

The modified data that is output by the driver software module may be output to a number of destinations, for example, to the peripheral device (or devices) that are part of the POS system (e.g. printer, scanner, display, payment terminal etc.) or to a further peripheral device (for example a secondary printer). One or more of the destination devices for the modified data may be a near-field communication enabled device and the modified data may then be sent from the POS terminal to the destination device via a NFC communication. The modified data may comprise transaction data, data for printing on a coupon/voucher to be handed to the user, data related to the consumer/customer, data related to the retailer, formatting data for a printer device (e.g. instructions to print double sided or in colour) and other types of data.

The driver module may conveniently comprise a data parser module.

The present invention as described above a technique that allows retailers to extend their POS to enable targeted coupons at till, QR-based loyalty, and payment-card loyalty, all without changes to the POS or payment processing software.

According to a second aspect of the present invention there is provided point-of-sale (POS) terminal comprising: a software module for enabling a retailer to process transactions within a transaction environment, the POS terminal being in communication with a peripheral device; a driver software module installed between the software module and the peripheral device wherein the driver software module is arranged to: receive data sent between the software module and the peripheral device in communication with the POS terminal; communicate with a further device in dependence on the data received at the driver software module; receive modified data from the further device; and output the modified data.

According to a third aspect of the present invention there is provided a method of enhancing the functionality of a point of sale (POS) system, the POS system comprising a POS terminal having a software module for enabling a retailer to process transactions within a transaction environment, and a peripheral device in communication with the POS terminal, the method comprising: installing a driver software module between the software module and the peripheral device, the driver software module being arranged, in use, to: receive data sent between the software module and the peripheral device in communication with the POS terminal; communicate with a further device in dependence on the data received at the driver software module; receive modified data from the further device; and output the modified data.

According to a fourth aspect of the present invention there is provided a method of operating a transaction server in communication with a POS terminal according to the second aspect of the invention, comprising: receiving data from the POS terminal; processing the data to generate modified data; outputting the modified data to the POS terminal.

Conveniently, where data received from the POS terminal comprises transaction item data and voucher related data, the processing step may comprise determining the presence of transactions associated with scanned vouchers in the transaction item data in order to verify that the terms of an offer have been met.

Conveniently, data received from the POS terminal may comprise transaction data which is stored in combination with loyalty and payment card information.

The data received from the POS terminal may comprise transaction data which is stored against a consumer identifier (which in turn may be derived from a payment card associated with the consumer in an online sign-up process). The transaction server may receive a request from a mobile device for transaction data stored in the transaction server. The mobile device may comprise a barcode scanning application which is arranged to scan a barcode on a receipt for an identifier that locates the transaction data stored on the transaction server.

In an alternative arrangement, a mobile device may obtain transaction data from a barcode printed on a receipt and this may be uploaded to the transaction server along with loyalty sign-up data.

The transaction server may be arranged to store current and future transaction data associated with a given consumer or mobile device. In this manner the transaction habits of a consumer over time may be tracked which would allow multi-transaction offers to be provided (e.g. an offer may be run that requires a consumer to purchase X items over a given period to receive a credit or other type of reward. By sending transaction data to the transaction server for storage such multi-transaction offers become possible).

It will be appreciated that preferred and/or optional features of the first aspect of the invention may be provided in the second, third and fourth aspects of the invention also, either alone or in appropriate combinations.

The invention extends to a carrier medium for carrying a computer readable code for controlling a computer or POS terminal to carry out the method of the first aspect of the invention and a carrier medium for carrying a computer readable code for controlling a server to carry out the method of the first, third and fourth aspects of the invention.

As described above, the aspects of the present invention described above provide a method to extend any existing point of sale system and supporting payment processing system to associate full or partial payment card numbers or a loyalty card or any the derivatives of these with the details of the transaction as printed on the receipt without modifying the point of sale or payment processing software. Each full or partial card number, its derivative or loyalty card may be used as a proxy for a customer, and an offer engine may select an appropriate offer to send to that card holder. Offers may be printed as coupons at till using the same printer used for printing receipts. Offers may also be printed (by the action of the driver software module) at a second printer other than the receipt printer. Relevant offers may be sent to a customer using any connection between a POS and a customer mobile device. Transaction data printed on the receipt may be sent to a user mobile device using any connection of the mobile device to the till. The present invention provides a method to extend any existing point of sales system to intercept and modify the content of the data sent to the receipt printer without modifying the point of sale or payment processing software. Receipt data may be intercepted, modified, and sent to the receipt printer with an additional code printed on the receipt. The code may be arranged such that it may be automatically read or manually input into a mobile device, by using an application running the mobile device to thereby recover the digital format of the receipt. The additional code may be read by a mobile device and then used by an application running on the mobile device to associate the user with current transactions to build a history of transactions associated with the user. The code may be processed by the application running on the mobile device and the user may be presented with rewards, requests for feedback, or request for reviews. The code may encode a payment card, or loyalty card used, and allow the application running on the mobile device to recover the payment card used or loyalty card used (or any of their derivatives) and to use these cards to associate user with any transactions where any of these card are used. Rewards or feedback requested may be conditional on the items in a current basket, the total amount spent on a current transaction, history of purchases or rewards over any period of time. Where the scanner data is intercepted, a barcode may be verified by an external application, and then translated to code that the POS application understands.

BRIEF DESCRIPTION OF THE DRAWINGS

In order that the invention may be more readily understood, preferred non-limiting embodiments thereof will now be described with reference to the accompanying drawings, in which:

FIG. 14 shows a process for signing and verifying a digital signature in accordance with an embodiment of the present invention;

FIG. 15 shows a process for signing and verifying offers in accordance with an embodiment of the present invention;

FIG. 24 shows an example of a rules structure for a points server;

DETAILED DESCRIPTION OF THE INVENTION

Figure 3:
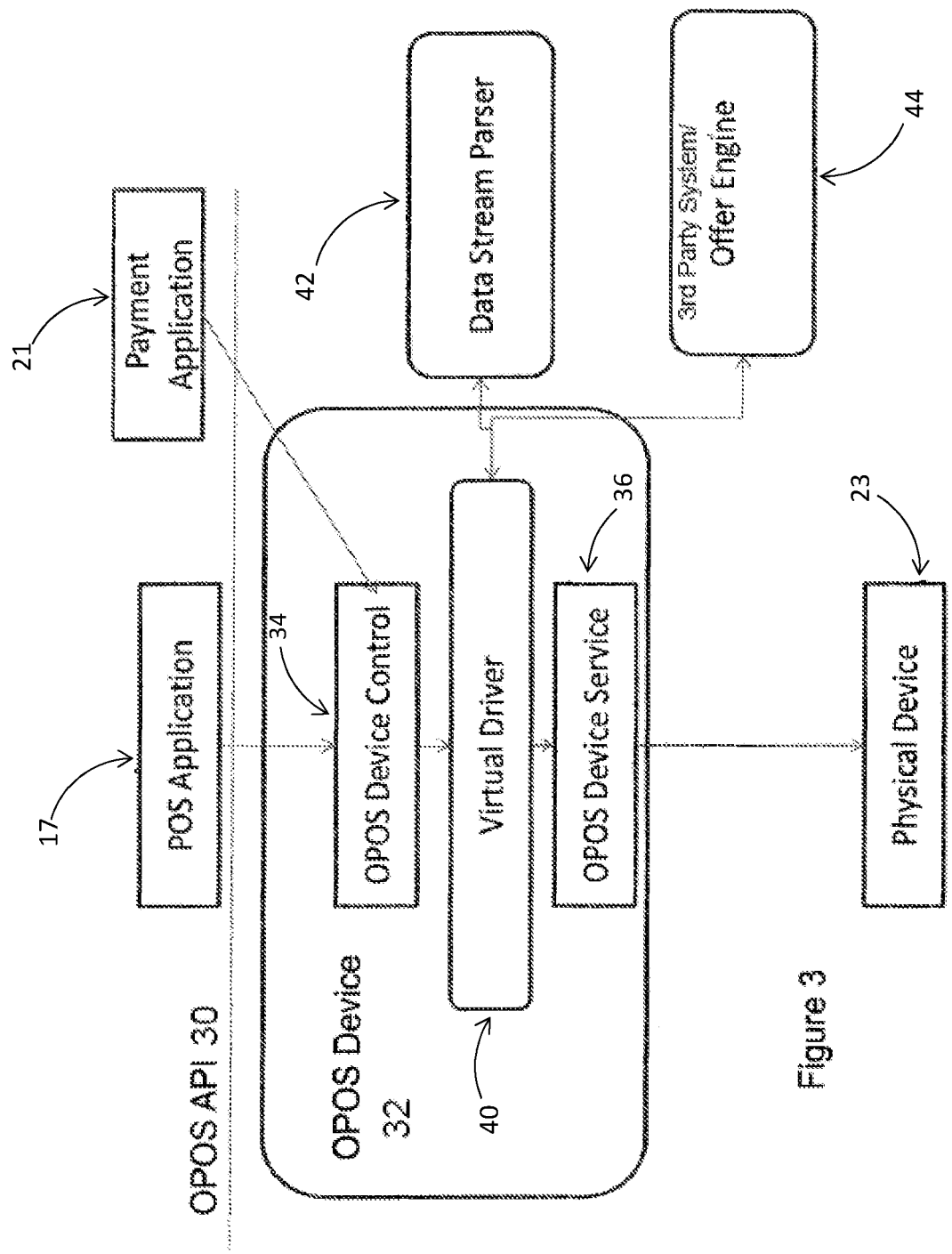
FIG. 3 shows an OPOS architecture in accordance with an embodiment of the present invention.

FIG. 3 shows a first embodiment of the present invention. It is noted that like numerals are used to denote like features throughout the claim set.

Figure 2:
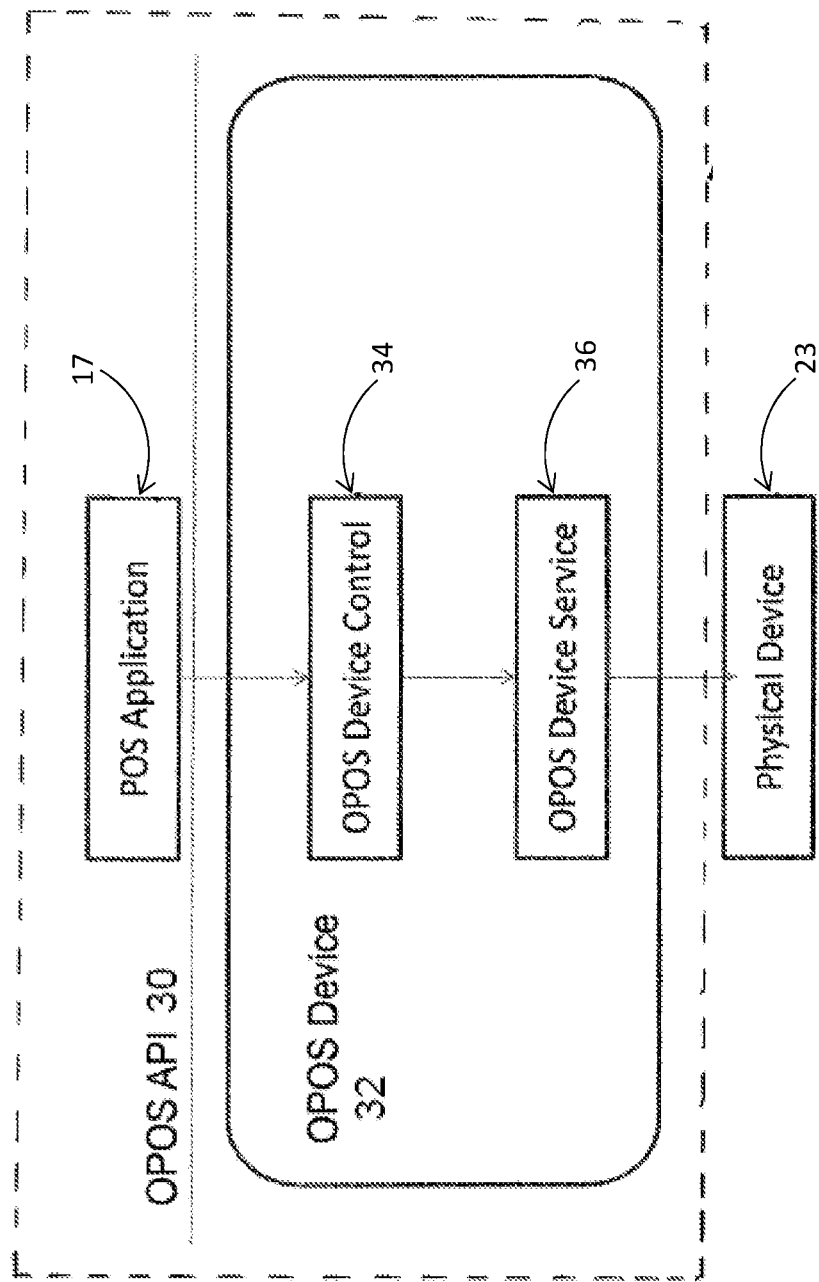
FIG. 2 shows an OPOS architecture.

The architecture depicted in FIG. 3 is similar to the known OPOS architecture of FIG. 2. The OPOS device 32 however now additionally comprises a virtual physical driver software module 40 that is located between the OPOS device control module 34 and the OPOS device service module 36.

The inclusion of the driver software module 40 enables data communications to and from the POS application software module 17 or payment application software module 21 to the physical device 23 to be monitored and intercepted. The driver software module 40 also enables data communications that originate from outside the POS system 1 to be inserted into the OPOS device 32 and routed to either the physical device 23 or the POS application 17/payment application 21 software modules. In this manner information relating to transactions can be extracted from the POS system 1 and additional information can be added into the communication path between the POS terminal 3 and physical devices (5, 7).

In more detail the virtual driver software module 40 may be installed and operated as follows:

In an installation step the virtual physical driver software module 40 may be installed onto the POS terminal 3 such that it sits between the OPOS device control software module 34 and the OPOS device service software module 36.

In a first operational step, each command passed through from either the POS application software module 17 or the payment application software module 21 to the physical device 23 may be monitored and passed to a data stream parser module 42.

In a second operational step, the data stream parser module 42 may parse the data to create a list of transaction items; total amount spent; details of any promotions; cashier name or id; and/or any other data of interest. The data stream parser 42 may be achieved using a regular expression parser. The stream parser 42 may also parse the details of the cards used (either partial details, such as last 4 card digits and expiry date, or complete details if available). It is noted that since the payment application software module 21 uses the stack OPOS device 32, the virtual physical driver module 40 may also intercept any extra information used when printing the retailer receipt (in case the retailer receipt contains full card details).

In a third operational step the virtual physical driver module 40 may pass the card and transaction data derived in the second step above to a third party system 44 (the server 60 or 64 referred to below may represent a third party system).

In a fourth operational step the third party system 44 may return modified data to the virtual physical driver module 40 which can then be supplied via the OPOS device service software module 36 to the physical device 23. In the example where the physical device 23 is the receipt printer 5 this allows the modified data (or a part or representation thereof) to be printed onto the customer's receipt.

In one example the third party system 44 may be an offer engine and depending on rules pre-set within the offer engine (e.g. to serve an offer to any customer who spent more than £20), the offer engine may generate an offer and pass it to the virtual physical driver module 40 for printing. Once the standard receipt data (e.g. store details, transaction items, transaction details etc.) has been printed, the virtual physical driver module 40 may print the offer received above to the POS system's receipt printer 5.

The virtual physical driver module 40 described above allows existing POS hardware to be used without any alterations to achieve the following:

Intercept transaction details without needing to modify the POS application software module 17;

Provide information from a third party system 44 to a customer using existing hardware (i.e. the receipt printer 5);

Associate transaction details with card details to thereby enable a loyalty scheme to be operated without any sign-up or loyalty cards to be used.

It is also noted that a POS terminal software module (either POS application software module 17 or Payment application software module 21) may in certain circumstances communicate directly with a physical hardware device rather than using an OPOS or JAVAPOS interface. Two alternative arrangements are therefore envisaged: (i) the software module (17, 21) may use ESC/POS (a command language used to drive receipt printers) or a similar language to directly to write to a serial port on the hardware device or to a USB device, or (ii) the software module may use a high-level printing API (for e.g. Windows printing architecture) and send rasterised data to the connected hardware device.

In arrangement (i) above, the data sent to the printer is a digital copy of the receipt and can be parsed as text. In arrangement (ii) above, the data sent to the printer is binary, and a parsing program would not be able to readily recover the details of the transactions.

Figure 31:
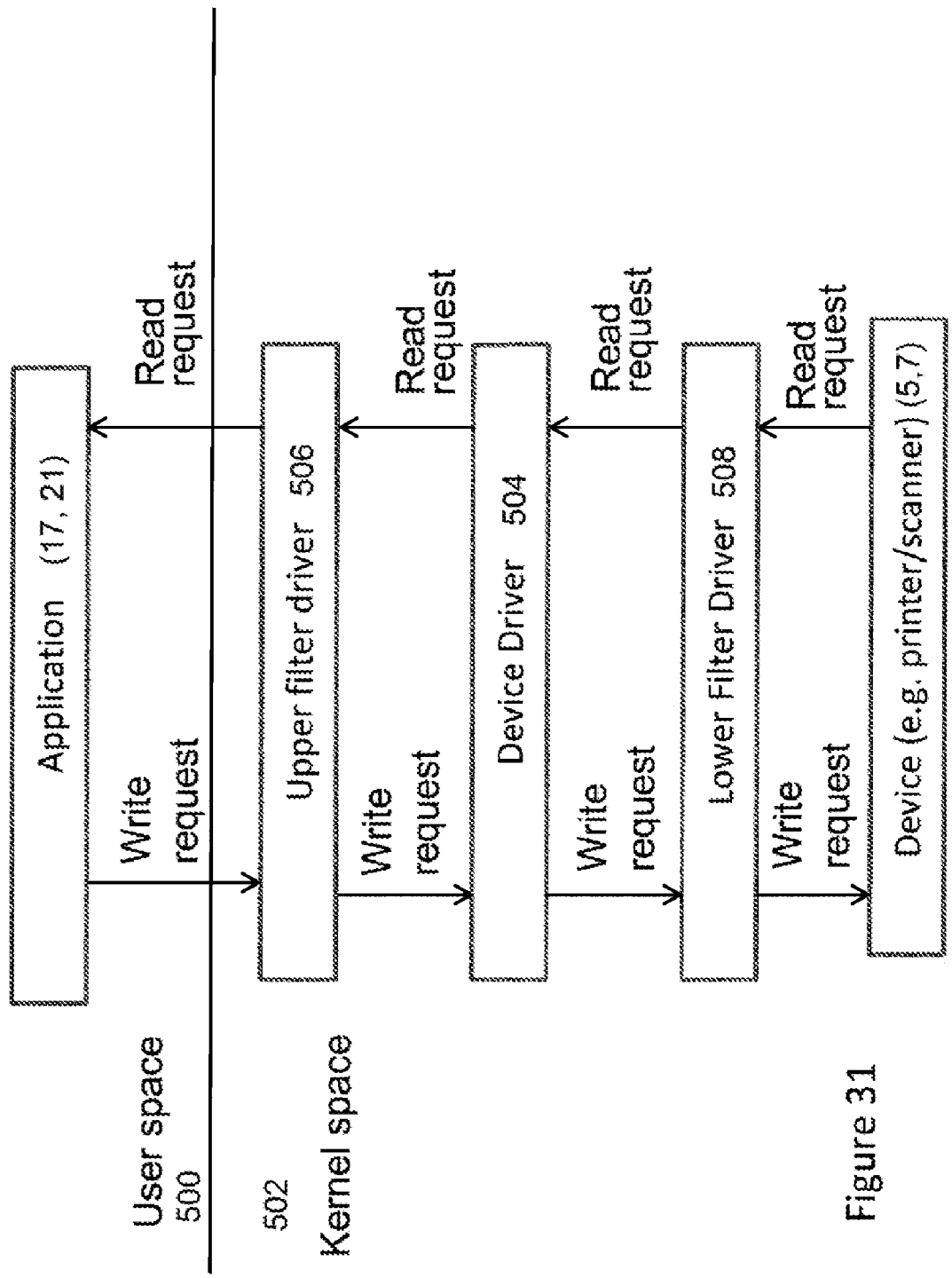
FIG. 31 shows a known filter driver architecture.
Figure 32:
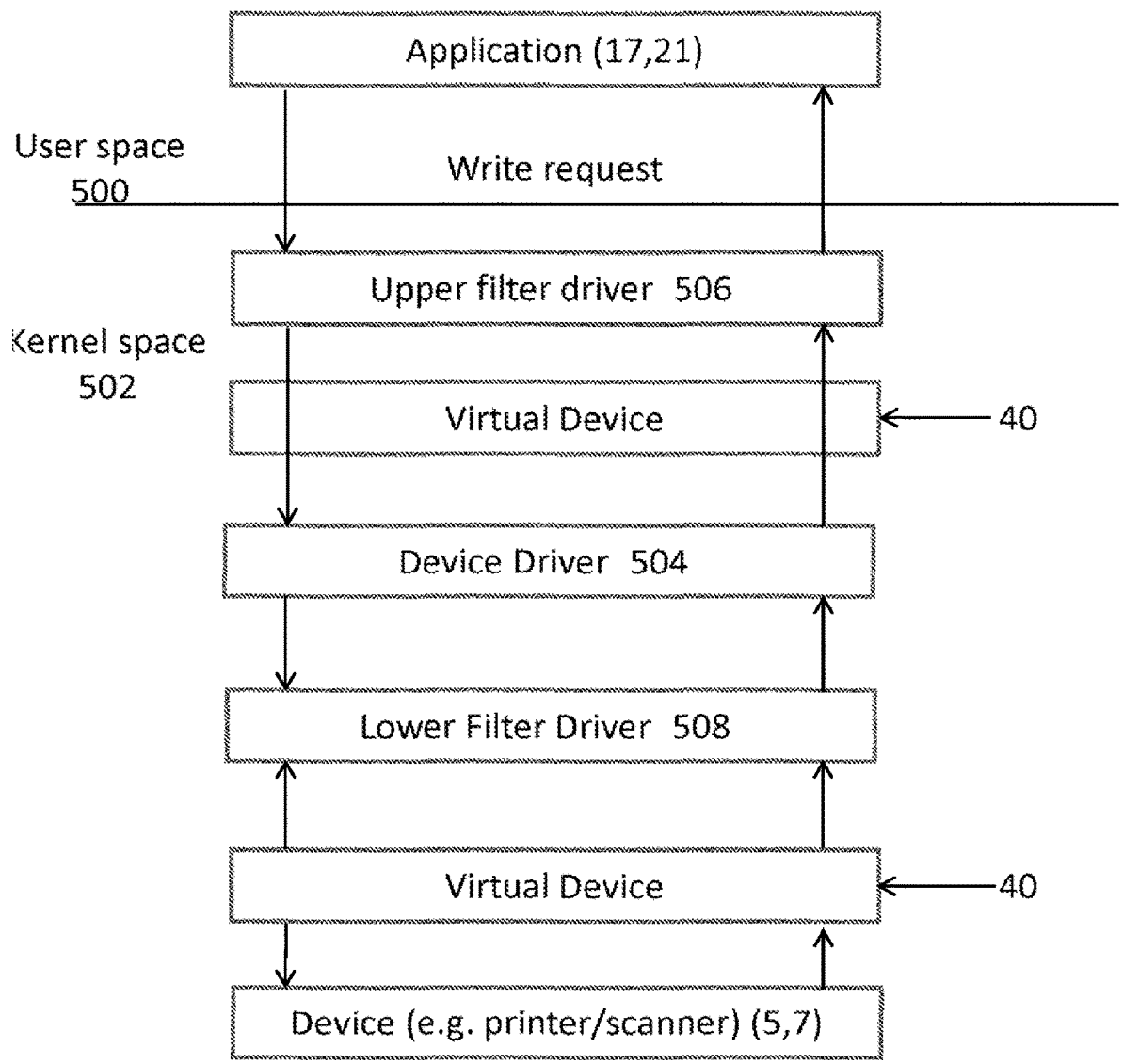
FIG. 32 shows a filter driver architecture in accordance with an embodiment of the present invention.

In arrangement (i), the virtual driver software module 40 may be implemented as a filter driver as shown in FIGS. 31 and 32. FIG. 31 shows a known POS terminal environment prior to modification in accordance with an embodiment of the present invention comprising a user space 500 and a kernel space 502 in which an application 17, 21 may read and write data to a physical device (5, 7) via a device driver 504 and upper (506) and lower (508) filter drivers.

It is noted that filter drivers are Microsoft Windows drivers that add value to peripheral devices or support specialized devices in a computing device. A filter driver is a driver/program/module that is inserted into an existing driver stack to perform some specific function. A filter driver should not affect the normal working of the existing driver stack in any major way. Written either by Microsoft® or the vendor of the hardware, any number of filter drivers can be added to Windows®. Upper level filter drivers sit above the primary driver for the device (the function driver), while lower level filter drivers sit below the function driver and above the bus driver.

Filters may work on a certain brand of device such as a mouse or keyboard, or they may perform some operation on a class of devices, such as any mouse or any keyboard. Another type of filter driver is the bus filter driver, which may be added on top of the bus driver. For example, an ACPI bus filter is added to support power management for each device.

Turning to FIG. 32, an embodiment of the present invention is shown in which it can be seen that the virtual device software module 40 may be implemented as a filter driver either below the upper filter driver 506 or below the lower filter driver 508.

Figure 33:
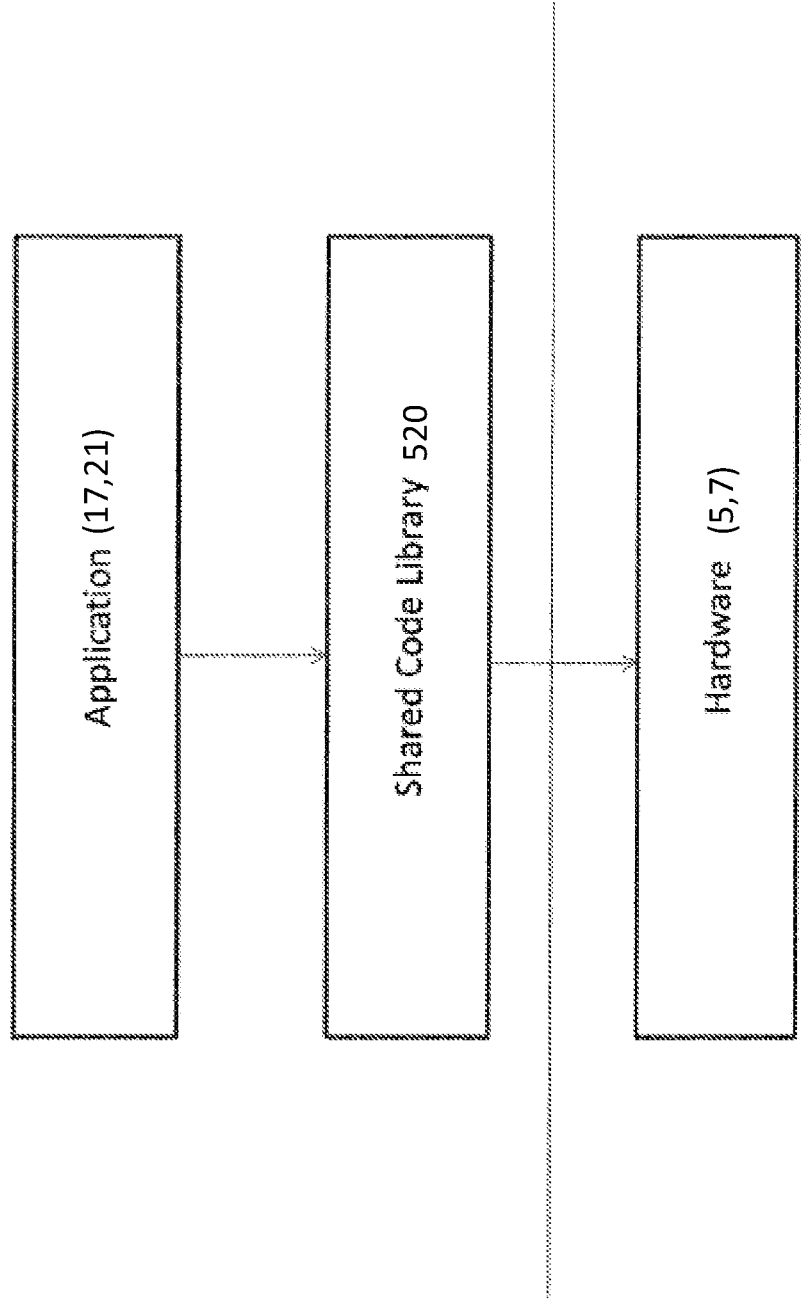
FIG. 33 shows a known API structure.
Figure 34:
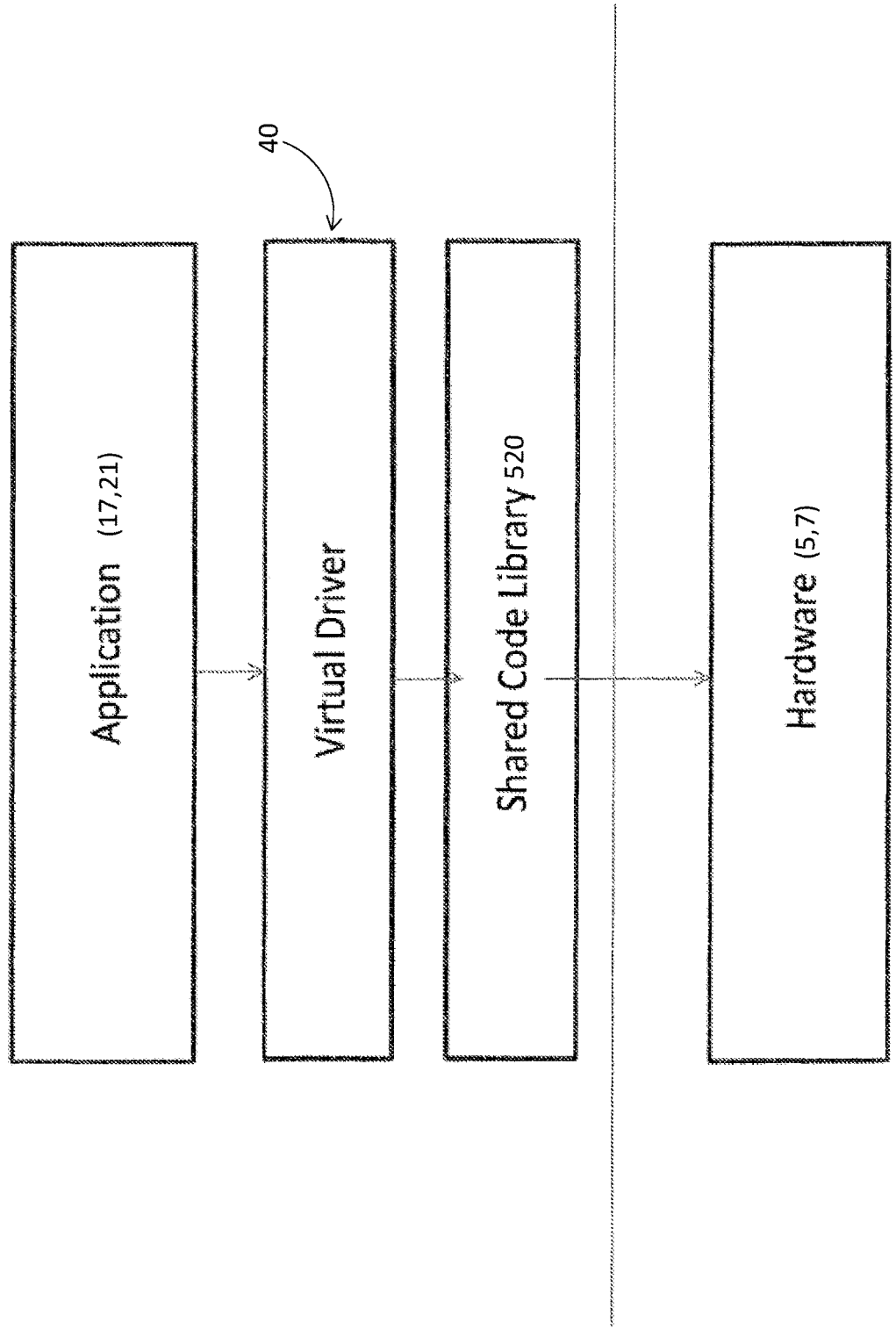
FIG. 34 shows a filter driver using hooked APIs in accordance with an embodiment of the present invention.

In arrangement (ii), the virtual driver may be implemented as a library that hooks the original API provided by the operating system with its own API hook. The virtual driver 40 may then transfer the API calls to the original library 520 provided by the operating system as shown in FIGS. 33 and 34.

Most OPOS or JAVAPOS service objects end up communicating with the hardware using the hardware driver installed in the OS. In this case, the virtual driver software module 40 may beneficially be installed as a filter driver and in the JAVPOS or OPOS layer. The reason is that changing the drivers stack to add a filter driver may be easier than changing the configurations of JAVAPOS and OPOS layers to accept an extra virtual device in the stack.

Figure 4:
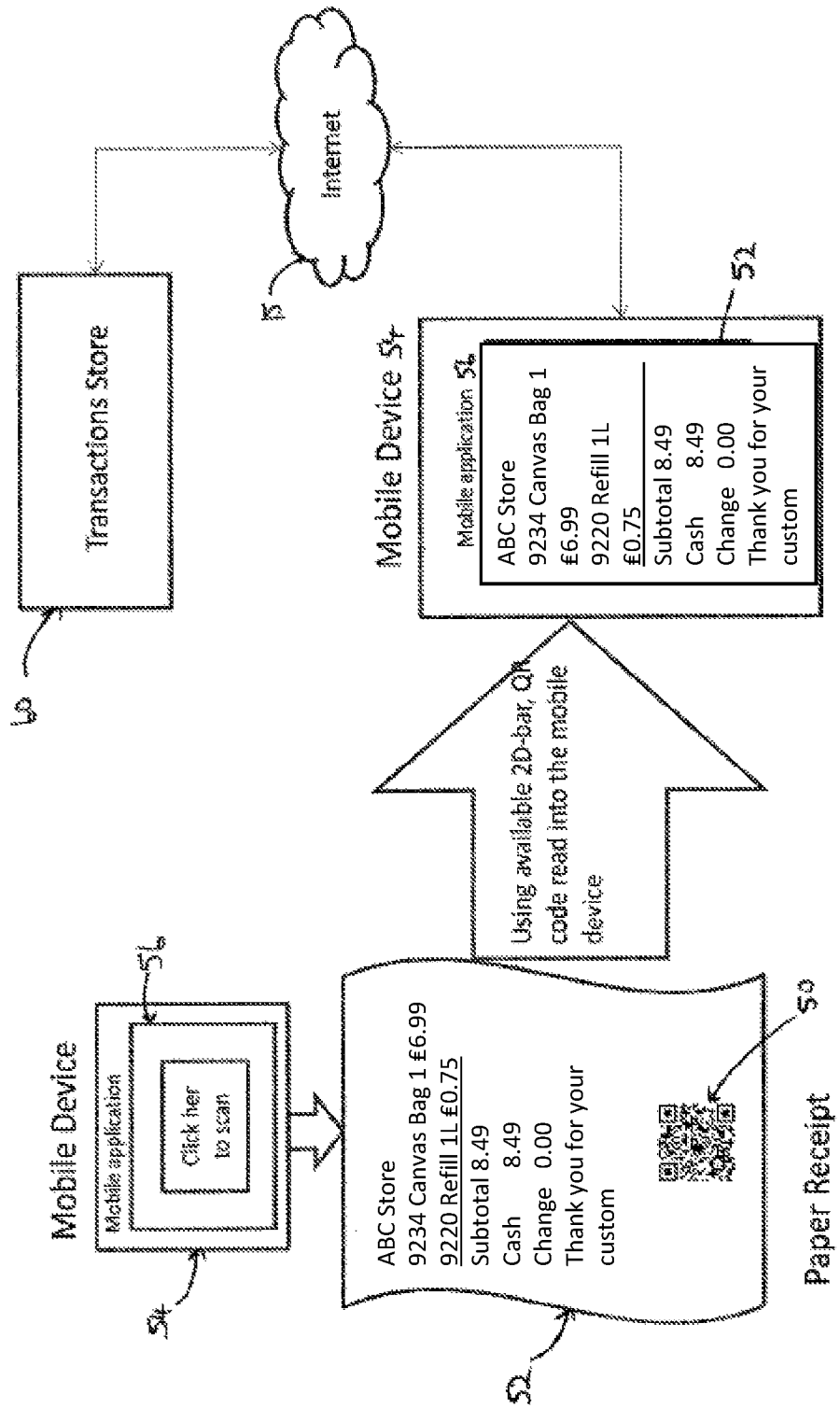
FIG. 4 shows a method of decoding a QR code to recover a digital receipt in accordance with an embodiment of the present invention.

As noted above, the virtual physical driver module 40 enables data to be printed onto the receipt that the customer receives at the end of the transaction. In turn this enables the following has manipulation of the receipt to be made:

1. A bar-code 50 (for example a QR code) may be printed at the end of the receipt 52 where that QR code either encodes the whole transaction, or acts as an identifier that identifies the transaction so that, once the QR code has been scanned the customer's mobile device 54 (e.g. smartphone), a digital copy of the receipt may be recovered and displayed on a mobile phone belonging to the customer. FIG. 4 shows the process of recovering the receipt 52: in case the receipt is too large, a simple identifier may be printed within the QR, and a mobile application 56 on the mobile device can use this identifier to fetch the transaction digital copy from a remotely located transaction store 60. It is noted in the example of FIG. 4 that the virtual driver module 40 additionally sends transaction data to the transaction store 60 as well as manipulating the information printed onto the receipt 52.

Figure 5:
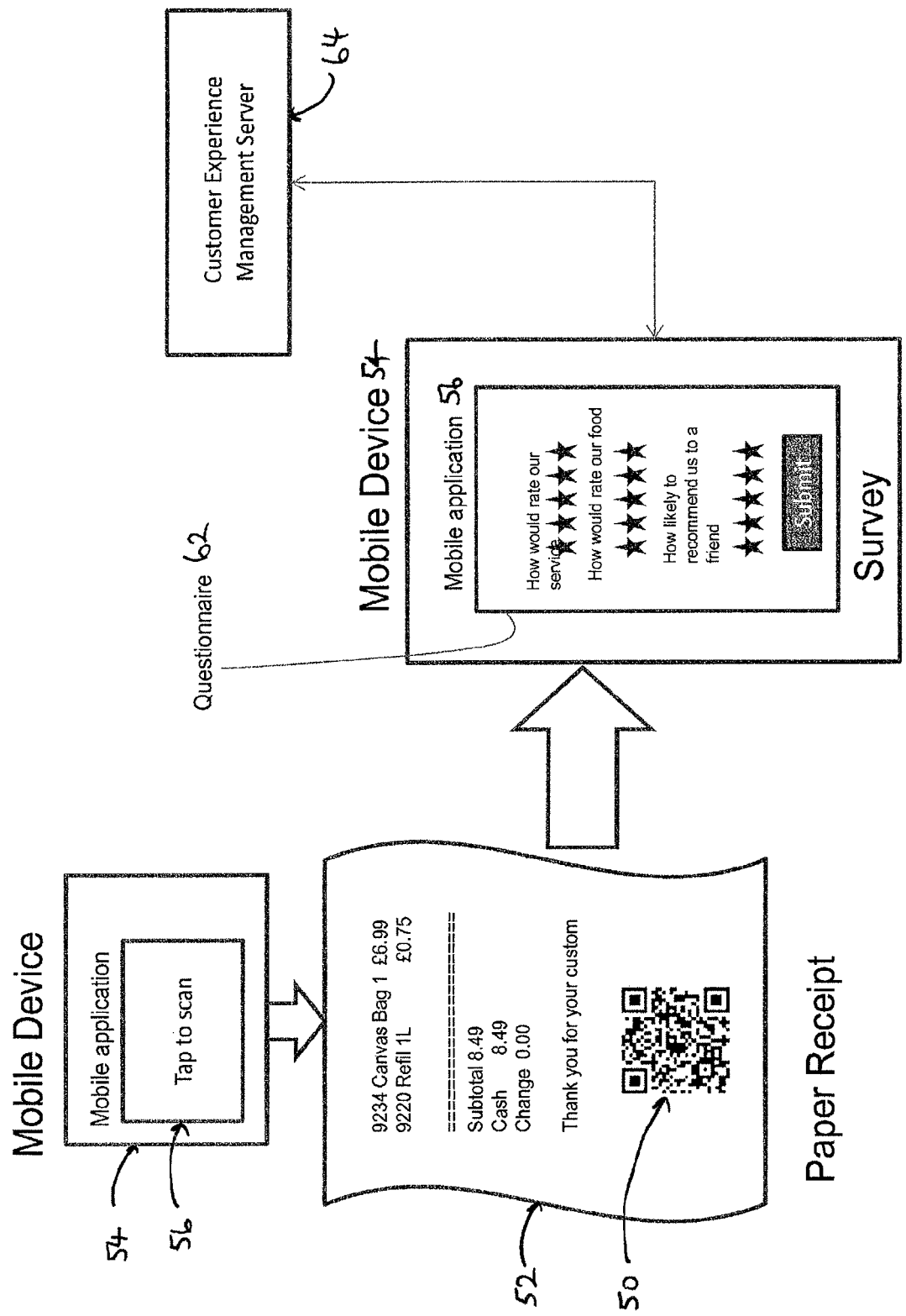
FIG. 5 shows an example of a questionnaire that has been scanned from a mobile device.

2. A bar-code 50 (for example a QR code) may be printed at the end of the receipt 52 such that once the code has been scanned by the customer, the customer is then presented with a questionnaire 62 of review questions on products or services offered by the retailer. The review provided to the customer may be correlated with the details printed on the receipt 52 to create a detail scoring of each item on the receipt (e.g. score the cashier, items bought, score based on time of the day of the transaction, score the store, all without explicitly asking the customer directly about any of these). The review questions may also be based on items bought, total spend and any other details pulled from the current transaction or historical transaction. This process is shown in FIG. 5 where it can be seen that the questionnaire is sent to the customer's mobile device 54 from a remotely located management server 64 (which may be the same server as the transaction server 60 described above).

3. A bar-code 50 (for example a QR code) may be printed at the end of the receipt 52 such that the QR code encodes the transaction details and also enables a loyalty scheme to be set up. In this example the customer has a mobile device 54 comprising an application 56 linked to a loyalty scheme provider. In this example the application 56 on the mobile device is associated with log-in details.

Figure 6:
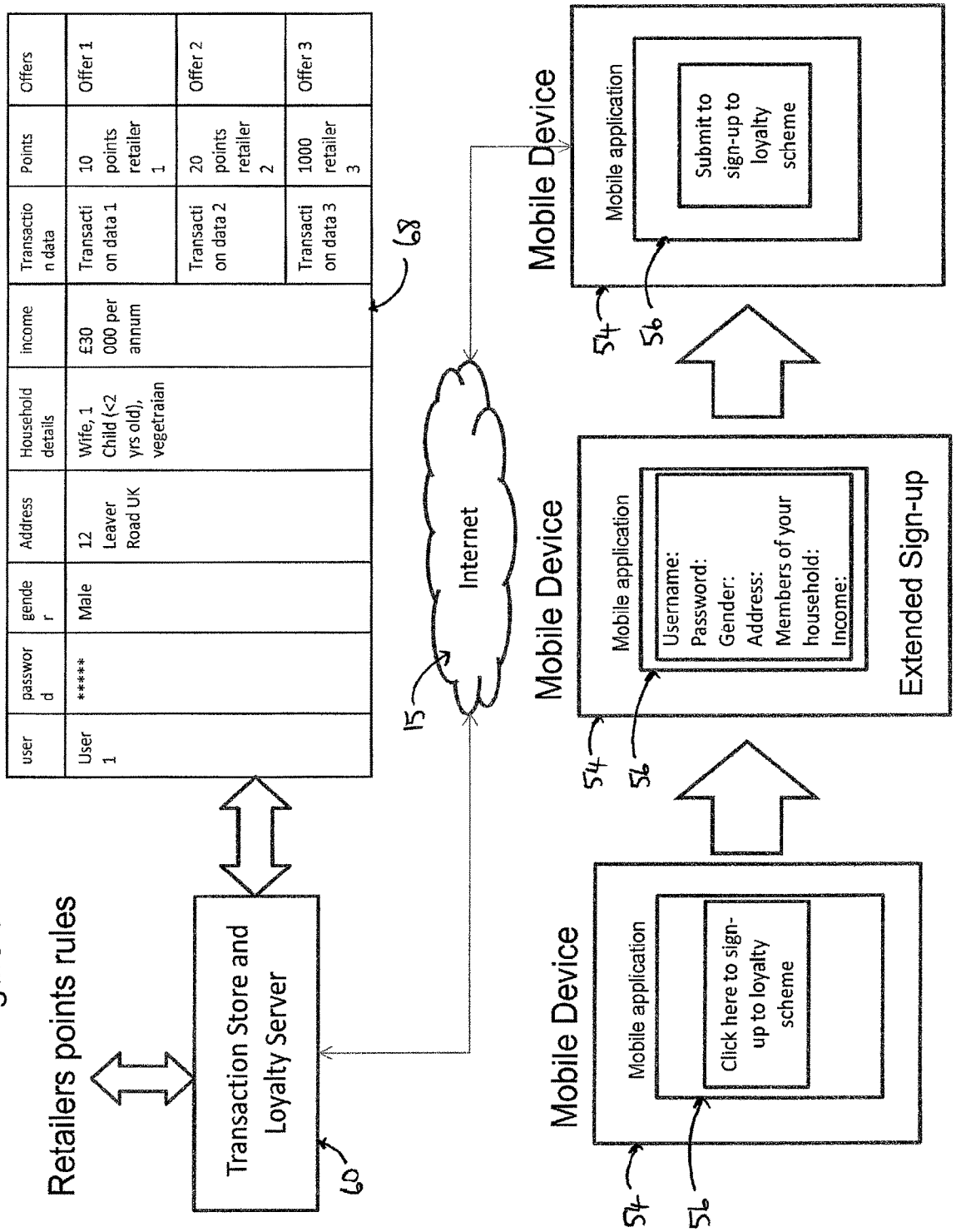
FIG. 6 shows an example of a sign-up process for a loyalty scheme in accordance with an embodiment of the present invention.

Upon scanning the barcode 50 on the receipt 52, the application 56 running on the mobile device 54 associates the login credentials of the application with the transaction encoded within the QR code in order to associate the user (customer) with the transaction details. The transaction details can then be shared with a back-end server 60 to create a loyalty scheme 68, where the application login credentials serve as a unique customer identifier (as opposed to a dedicated and separate plastic loyalty card). This process is shown in FIG. 6. It can be seen that every the time the customer scans a receipt 50, the transaction details encoded thereon may be synched with the back-end server (the "transaction store and loyalty server" 60) thereby creating a history of user purchases. FIG. 6 additionally depicts a table 68 that shows how points may be tracked per customer.

Figure 7:
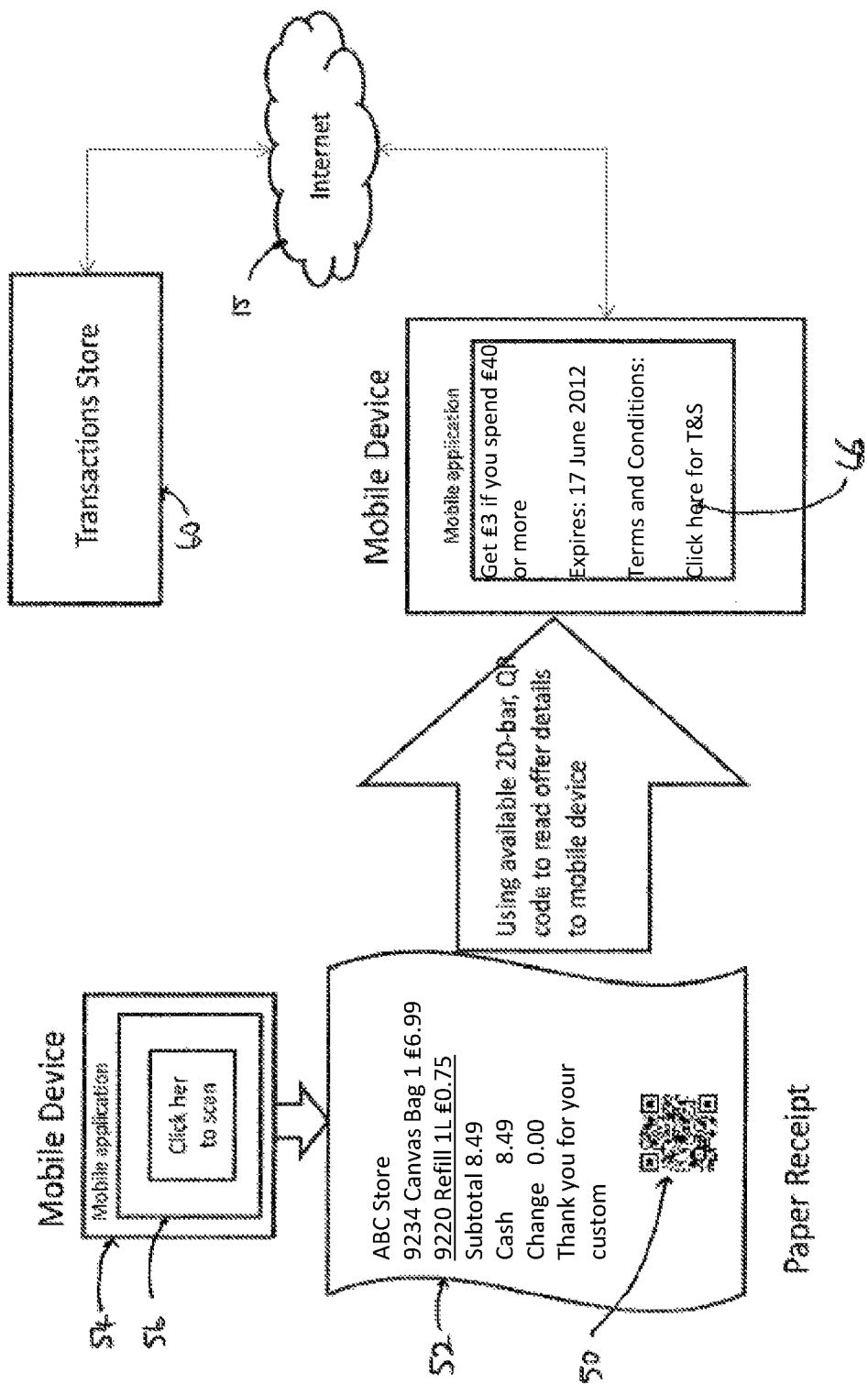
FIG. 7 shows the process of decoding a QR code to recover an offer in accordance with an embodiment of the present invention.

4. A bar-code 50 (for example a QR code) may be printed at the end of the receipt 52 such that the QR code encodes transaction details and, upon scanning the barcode, an application 56 running on the customer's mobile device 54 checks to see if the customer has activated an offer. If the customer has activated an offer 66 then the transaction details encoded within the barcode on the receipt may then be checked against the conditions of the offer. If the offer conditions are met then the user may be provided with points, rewards, or cashback. The offer redemption process is shown in FIG. 7.

The bar code should be tamper-proof. To achieve this, a digital-signature may be added to the transaction data captured by the virtual driver module 40 before it is transformed to a QR code. Once the QR code s scanned and sent to a server, the server may then check the integrity of the QR code.

Further applications derived from the use of the virtual physical driver module 40 comprise:

5. As a variation on application 4 above, the bar-code 50 that has been printed on the bottom of the receipt 52 by the Virtual Driver 40 may allow the user to receive an offer 66 (as opposed to processing an offer they have already set up). A simple identifier of the offer can instead be printed, and offer details can be fetched from a remote offer store 60 (transaction store 60) as shown in FIG. 7.

6. A bar-code (for example a QR code) may be printed at the end of the receipt which encodes transaction details and also details of the payment cards and/or loyalty card used in the transaction. The barcode may then be scanned by an application running on the mobile device of the customer to decode the barcode, retrieve the embedded card details and store them within the application on the mobile device, so that every time those cards are used, the receipt is automatically associated with that user, and the application running on his mobile can use the stored cards to retrieve any information related to the user (e.g. digital receipts, offers, points and so on).

It is noted that the virtual driver module 40 may also be arranged to call another service running locally or remotely to retrieve an offer and formats the offer to be printed to the same printer used for printing receipts. The offers printed can be targeted to the customer based on items in the current basket, historical profile of the customer or any combination thereof. It is noted that any offers that are retrieved by the customer or sent to the customer can be printed on any printer device accessible from the POS terminal 3.

As explained above, the virtual driver module 40 may be used to issue coupons and vouchers with a barcode 50 printed on them. In cases where retailers want to check that each bar code is valid and also has not been used before, the architecture as shown in FIG. 2 may be applied to data received from the scanner 7 so that coupons and vouchers may be validated as follows:

I. In a first step the retailer may scan the coupon or voucher where a bar code with a unique pattern is printed. For example, the bar code may be printed so that first few digits identify a unique vendor;

II. In a second step, the virtual driver module 40 may intercept the bar code and, if a unique pattern above is detected, it may query a central server to validate the voucher;

III. If the voucher has already been used or has never been issued, the server may send back a non-authorisation response. The scanned item may then be discarded, and the cashier notified;

IV. If the voucher is valid, two options may happen:
   a. the bar code may be sent to the POS application module 17 in the format it was scanned in, or;
   b. the barcode may be translated to a barcode of a different format that can be understood by the POS application module 17, and then this new bar code may be sent to the POS application module 17.

Further embodiments of the present invention are described below.

Multi-Transaction System

The POS system described above in relation to FIGS. 2 and 3 may be used to operate a transaction system that can track a user's transactions across multiple transaction instances.

As noted above FIG. 1 shows a typical point of sale configuration.

Figure 8:
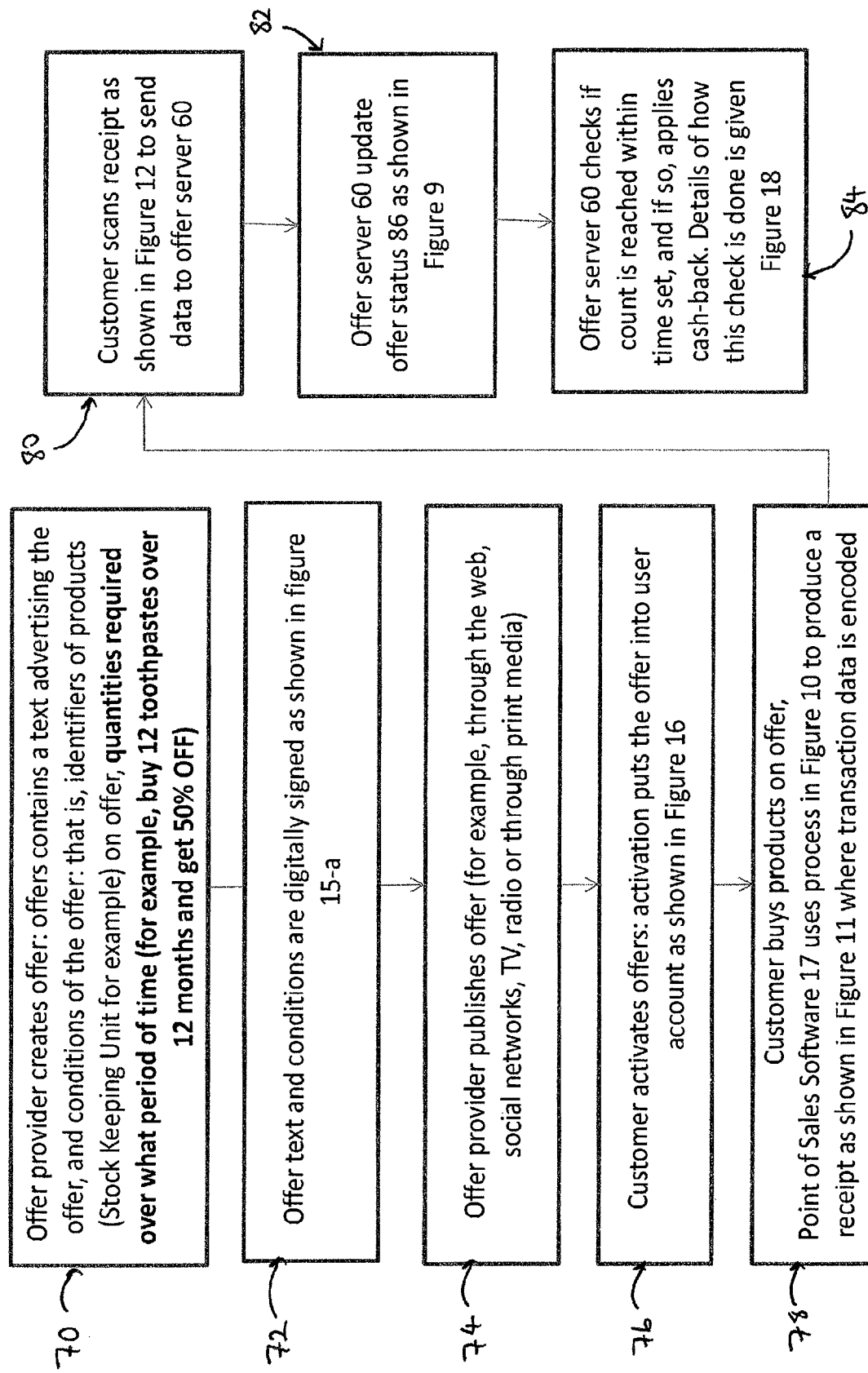
FIG. 8 shows an overview of an offer process in accordance with an embodiment of the present invention.

FIG. 8 shows a high level overview of the process (70, 72, . . . 84) of creating and redeeming multi-purchase offers. It is assumed that the retailer has created an offer, and distributed it through a suitable medium (social networks, print media or web). To guard against counterfeiting, an offer can be digitally signed using the process shown in FIG. 14-*a*.

Figure 9:
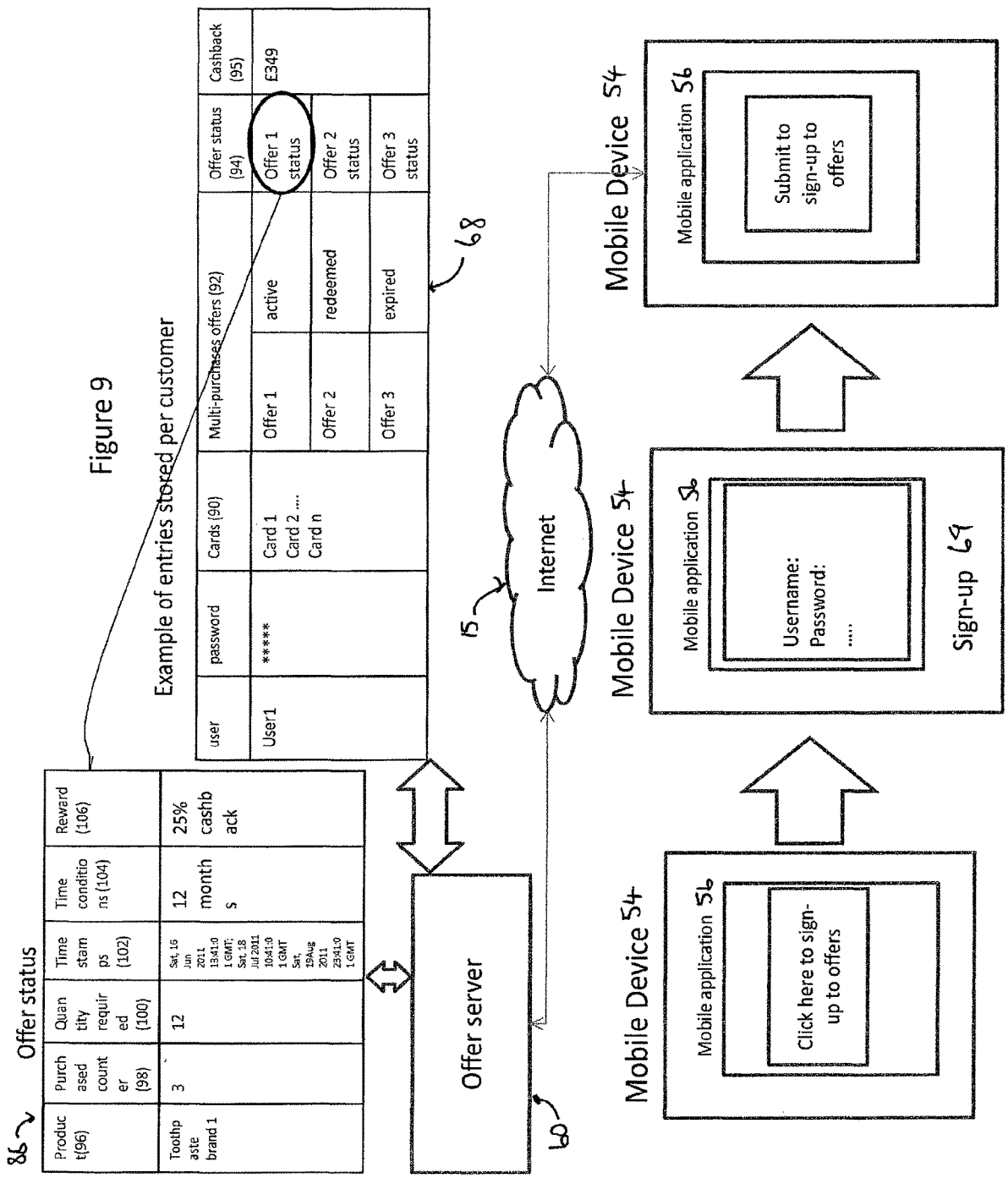
FIG. 9 shows a sign-up process in accordance with an embodiment of the present invention.

FIG. 9 shows the process of sign-up and an overview of tables 68, 86 maintained by the offer server 60 for each user. For example, using a mobile device 54 running a mobile application 56, the customer is prompted to sign up to offers. By signing up to offers, the customer will be able to receive offers, associate them with his/her account, and redeem them. To do so, the customer chooses a name and password to sign-up as shown in the sign-up process 69. The offer server 60 creates an entry for this user in table 68. This entry includes a username and password to authenticate this customer. Customers can also associate with this account any cards used in payment and loyalty cards and if the customer chooses to do so, the column cards 90 hold these cards identifiers. As the user associates offers with his account, the column multi-purchase offers 92 is populated. Each offer is tracked using the offer status column 94. This column is expanded in table 86 and shows:

1. Product in offer 96, this is the product currently on multi-purchase offer
2. Purchased counter 98 counts how many times this product has been purchased
3. Quantity required 100 is the quantity set by the retailer/manufacturer as a prerequisite before the reward can be activated
4. Timestamps 102: timestamps recording when the product on offer has been purchased by the customer
5. Time condition 104 is the period over which the multi-purchase quantity should be reached.
6. Reward 106: is the reward to be given to the customer if conditions met. In this example, reward customer 25% of price paid for toothpaste brand 1 if he buys the product 12 times at least, within 12 months period.

Figure 10:
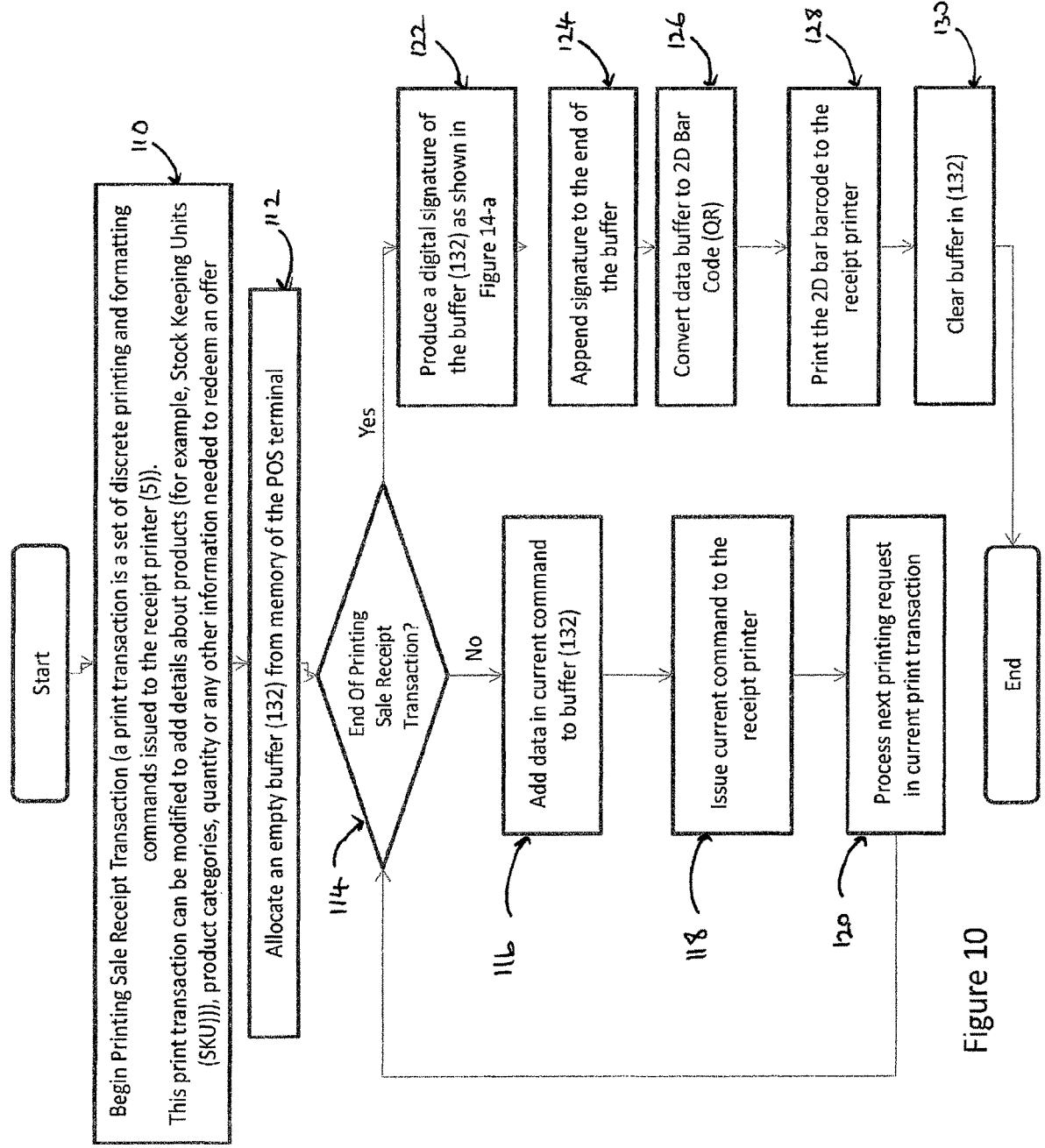
FIG. 10 shows an encoding process for encoding transaction data in accordance with an embodiment of the present invention.

FIG. 10 shows the process of encoding transaction data into a 2D bar code based on receipt data. Buffer 132 is allocated from memory of the POS till, and initialised to empty buffer.

Figure 11:
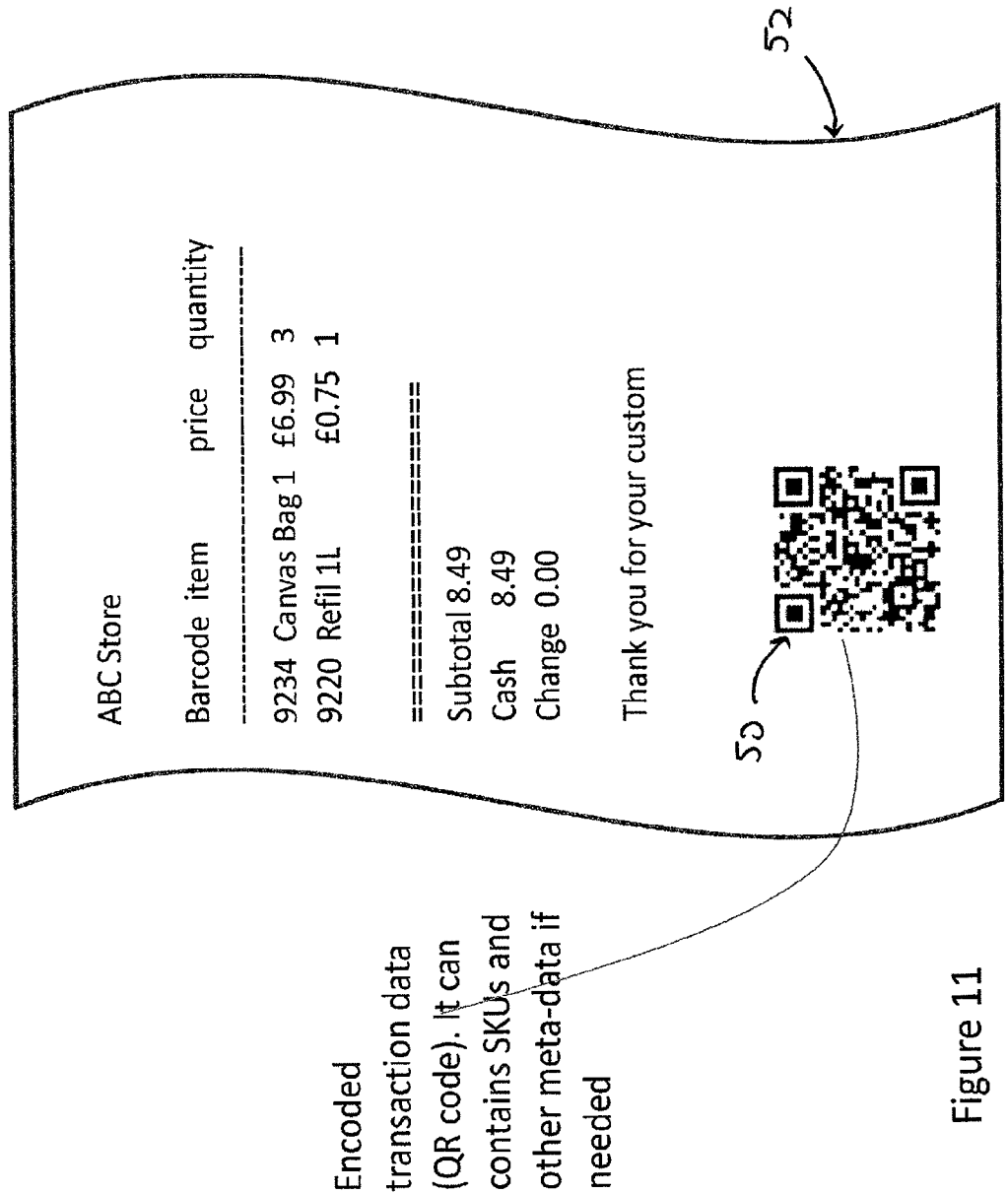
FIG. 11 shows an example of a receipt with a barcode printed in accordance with an embodiment of the present invention.

FIG. 11 shows a receipt 52 with encoded transaction data as a QR 50 on the bottom of the receipt.

Figure 12:
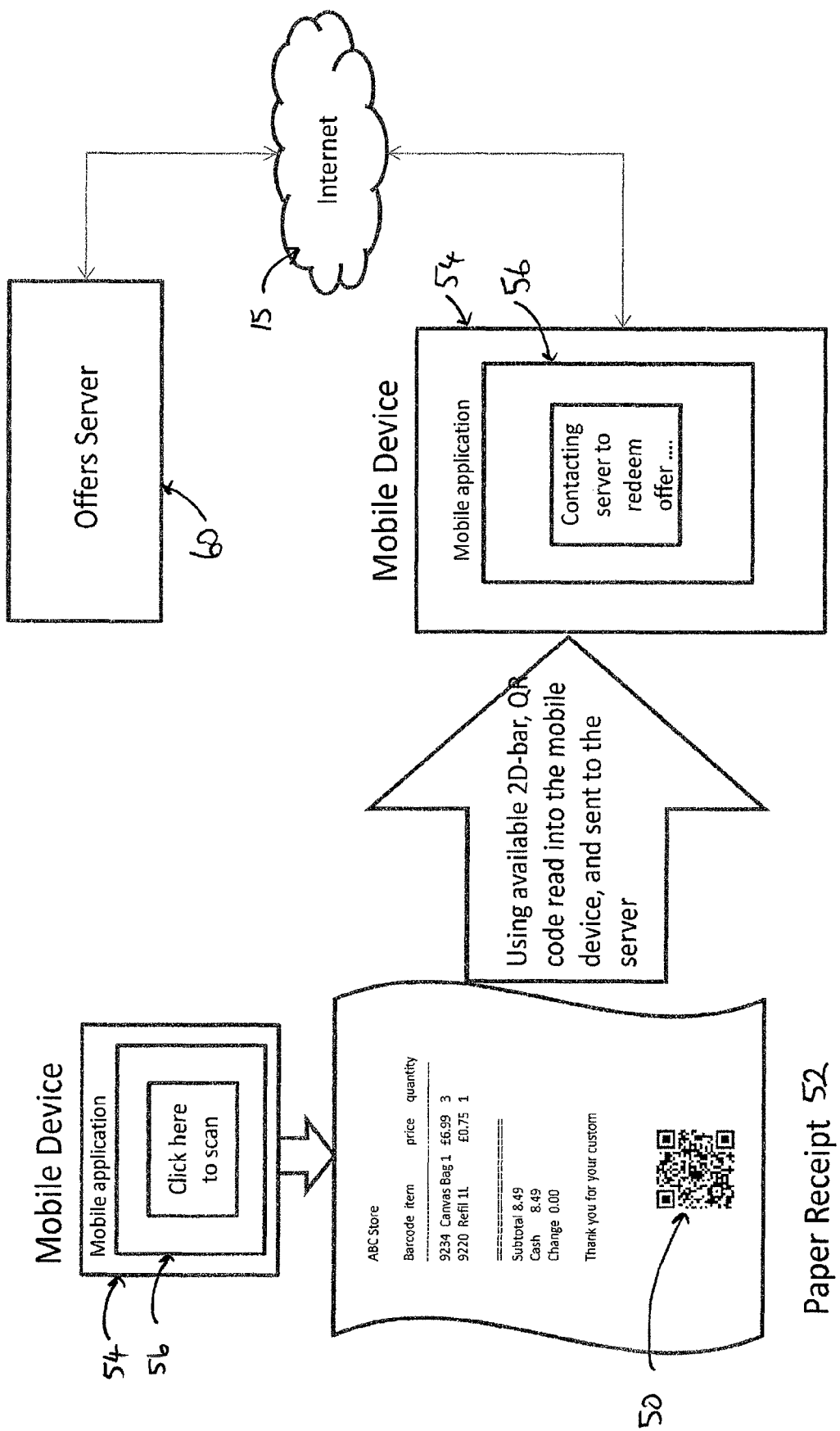
FIG. 12 shows the process of decoding a barcode on a receipt to check an offer in accordance with an embodiment of the present invention.

FIG. 12 shows the process of decoding transaction data from receipt 52. A mobile device 54 running a mobile application 56 with scanning function scans the QR code printed on paper receipt 52 and mobile application then converts the scanned data into original receipt data and sends to offers server 60. Scanning of the QR code may use a camera on the mobile device 54.

Figure 13:
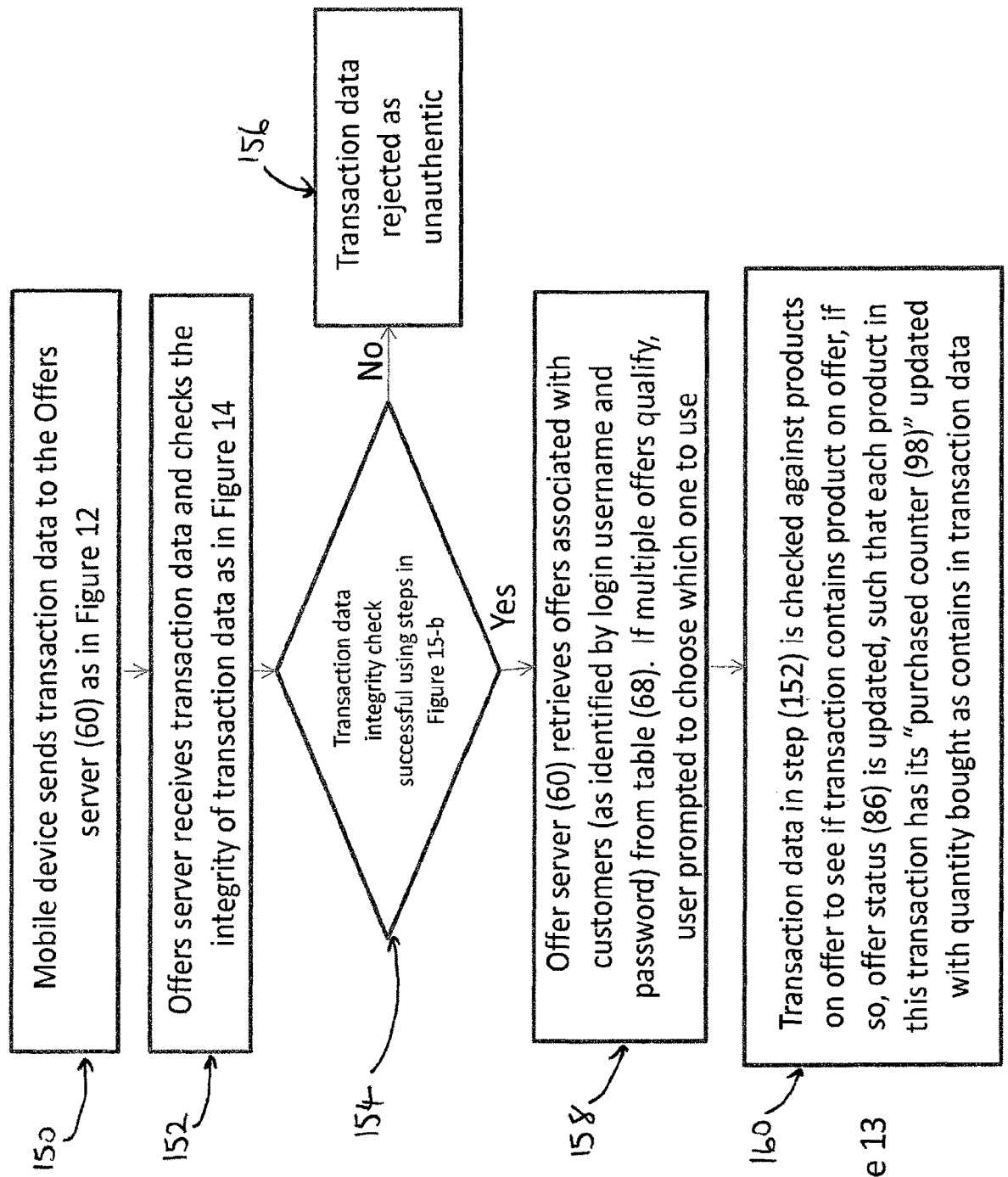
FIG. 13 shows a process for updating a status table in accordance with an embodiment of the present invention.

FIG. 13 shows a process to update the offer status table 86 with the transaction that the customer has just completed. This process enables the customer to "upload" transaction data as printed on his receipt to the offers server 60 so that it keeps track of what the customer bought.

FIG. 14 shows the process of digital signature creation and verification. FIG. 14-*a* shows how the transaction data printed as a 2D bar code 50 is first digitally signed before being printed to the receipt 52. FIG. 14-*b* checks the authenticity of the 2D bar code data.

FIG. 15 shows how offers can be digitally signed by the retailer/manufacturer (FIG. 15-*a* shows the process of signing an offer. The process of verifying the digital signature is shown in FIG. 15-*b* (FIG. 15-*b* verifying offer).

Figure 16:
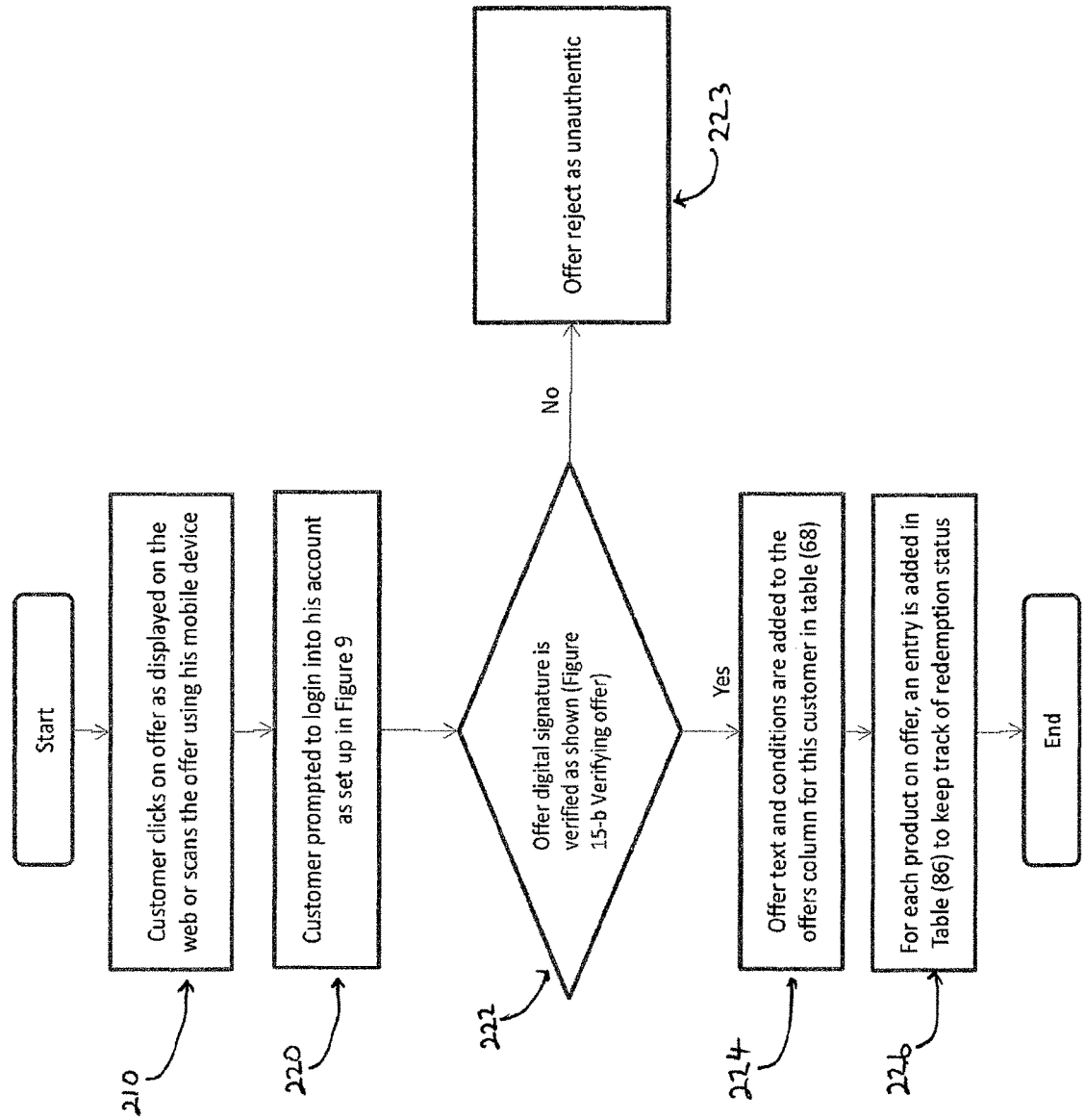
FIG. 16 shows an offer activation process in accordance with an embodiment of the present invention.

FIG. 16 shows how an offer published by the retailer/manufacturer is activated, that is associated with the user account.

Figure 17:
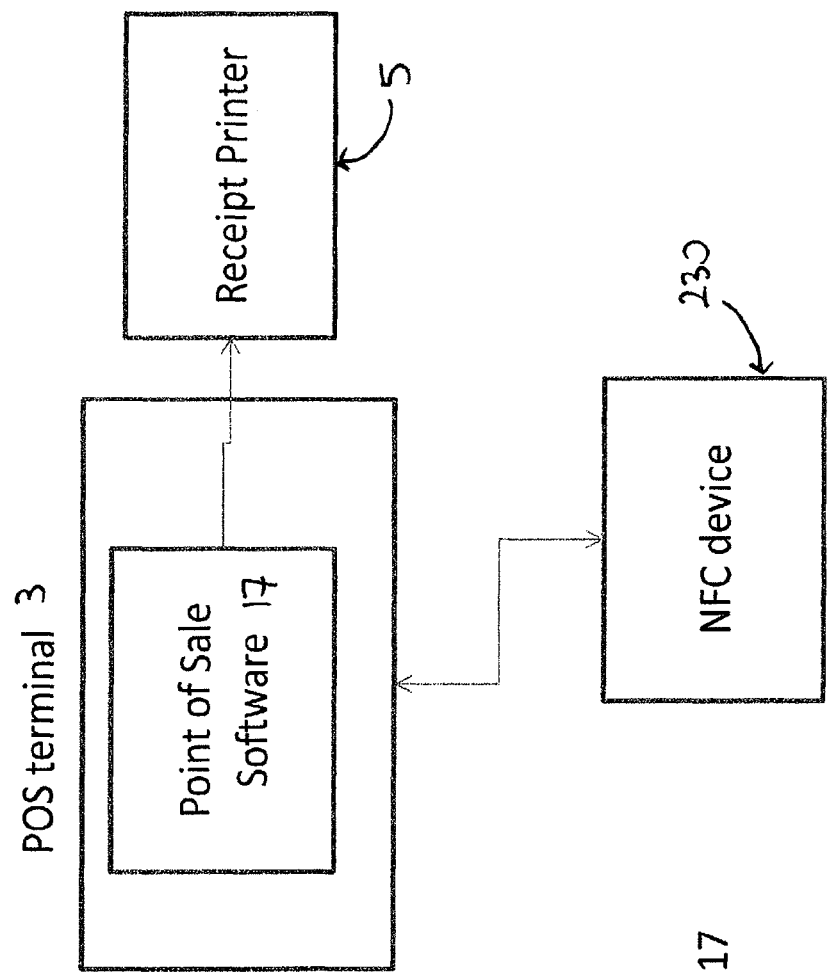
FIG. 17 shows a POS till with attached NFC device.

FIG. 17 shows a POS till 3 with NFC device 230 attached that can be used to receive transaction data, instead of asking customer to scan 2D Bar code 50. In a POS till 3 with this configuration, instead of encoding the data into a 2D bar code 50, and printing the result into a paper receipt 52, the buffer 132 data is instead transferred directly to the customer mobile device 54 using NFC hardware attached to the POS terminal 3. No 2D bar code is printed to the receipt.

Figure 18:
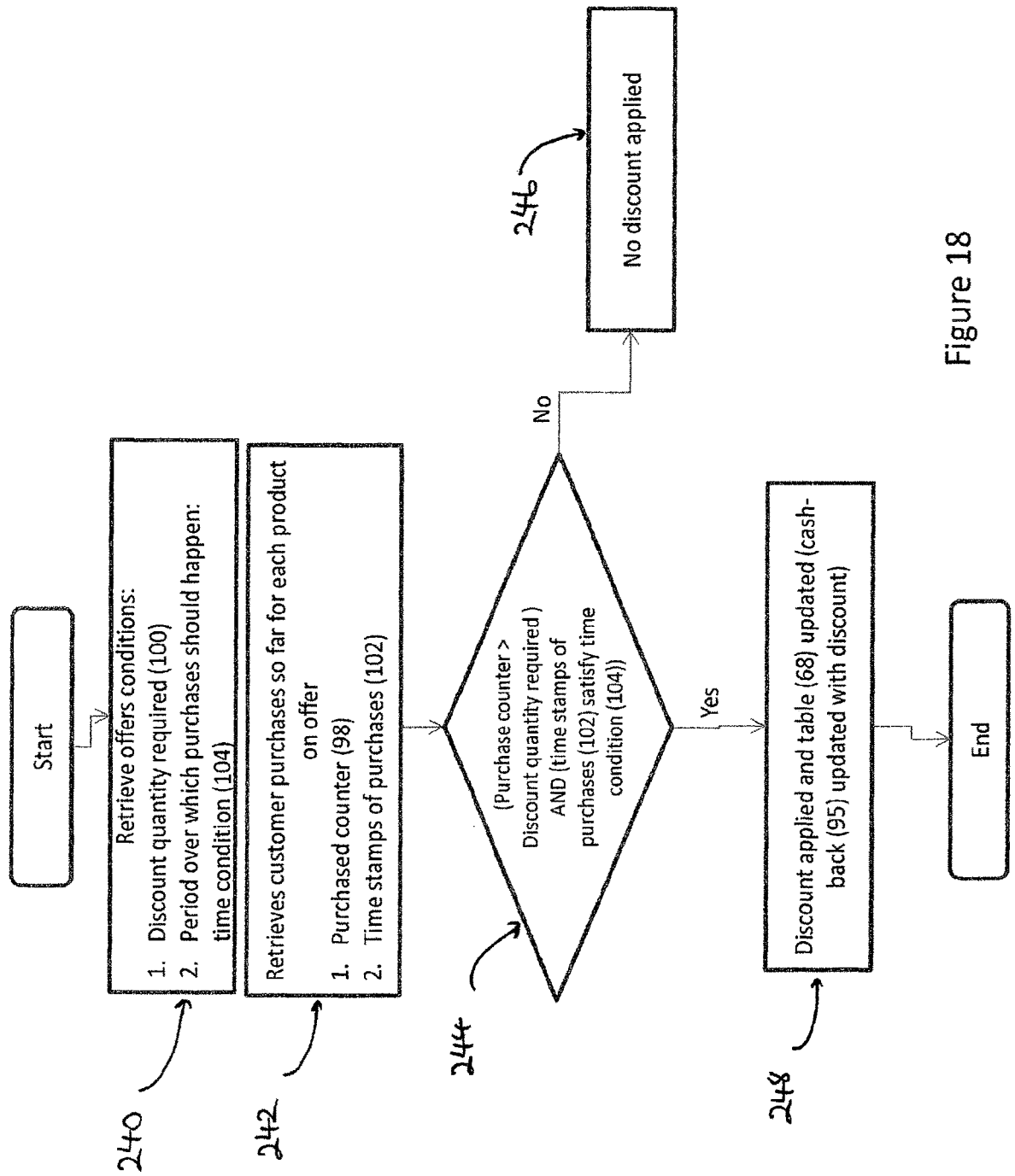
FIG. 18 shows a process for a multiple-purchase offer scheme in accordance with an embodiment of the present invention.

FIG. 18 shows a multiple-purchase offer redemption process.

Method to Redeem Offers

The POS system described above in relation to FIGS. 2 and 3 may be used to operate a transaction system that can redeem offers within a transaction environment.

Figure 19:
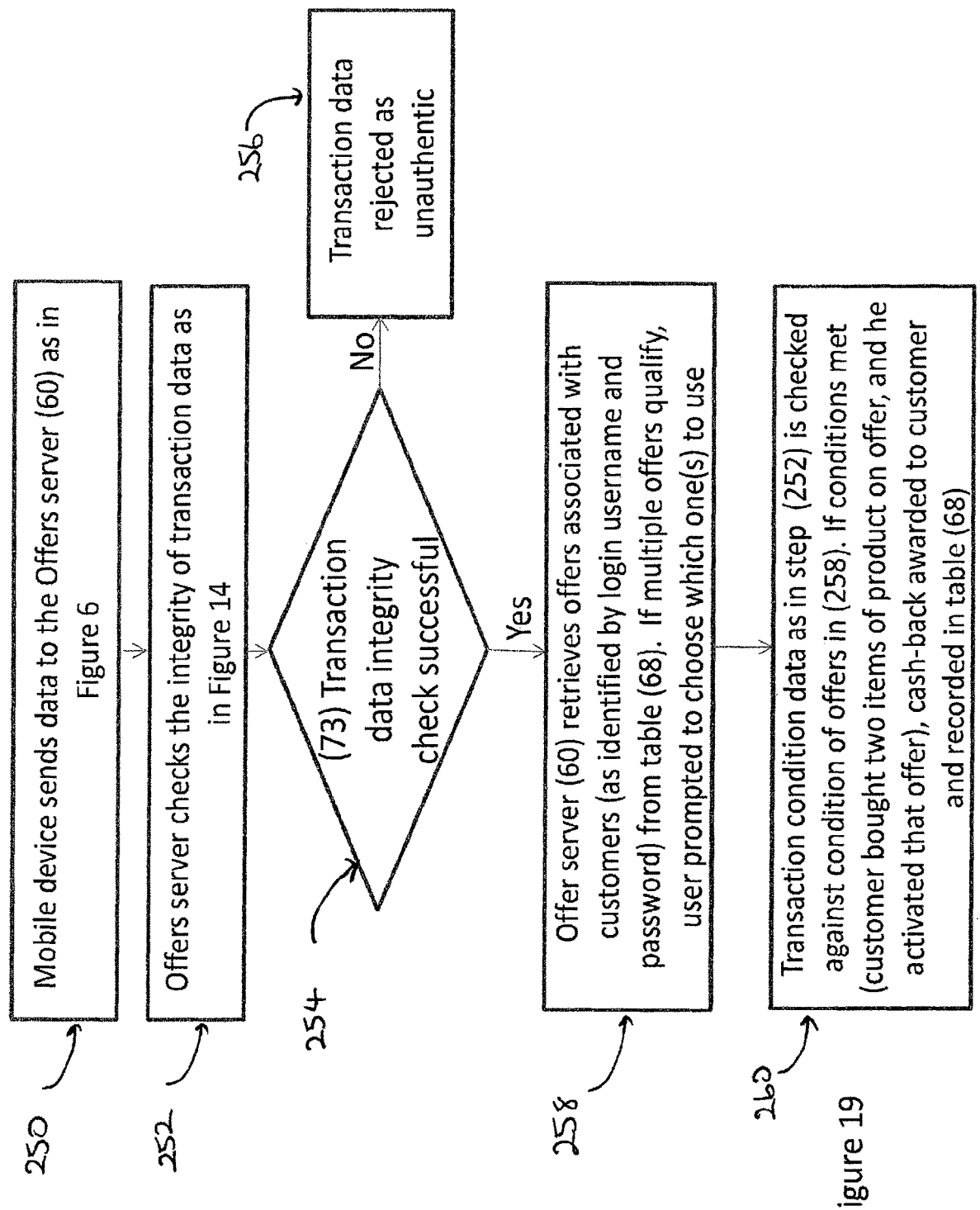
FIG. 19 shows a process of checking and redeeming an offer in accordance with an embodiment of the present invention.

FIG. 19 shows the process of checking and redeeming an offer in accordance with an embodiment of the present invention. A mobile device sends to data to a server that has received transaction data from a POS system according to FIGS. 2 and 3.

Voucher Redemption

This embodiment of the present invention presents a method through which a customer uses his payment or loyalty card (or any card that uniquely identifies customers and is already integrated with point of sale) to redeem an offer. Offers can be set to depend on a number of conditions (for example, buy one get one free). As a virtual driver module 40 as described in relation to FIGS. 2 and 3 is installed on the POS system, no assumption is made on the sophistication of the POS software nor does it requires the POS software to cooperate with the redemption process.

In this embodiment of the present invention, the customer receives an offer through a web page (for example, s retailer's web page), a mobile application running on customer smartphone or any other medium. Redemption of the offer may happen in two steps:
1. Offer Activation
2. Offer Redemption 1. Offer Activation.

Figure 20:
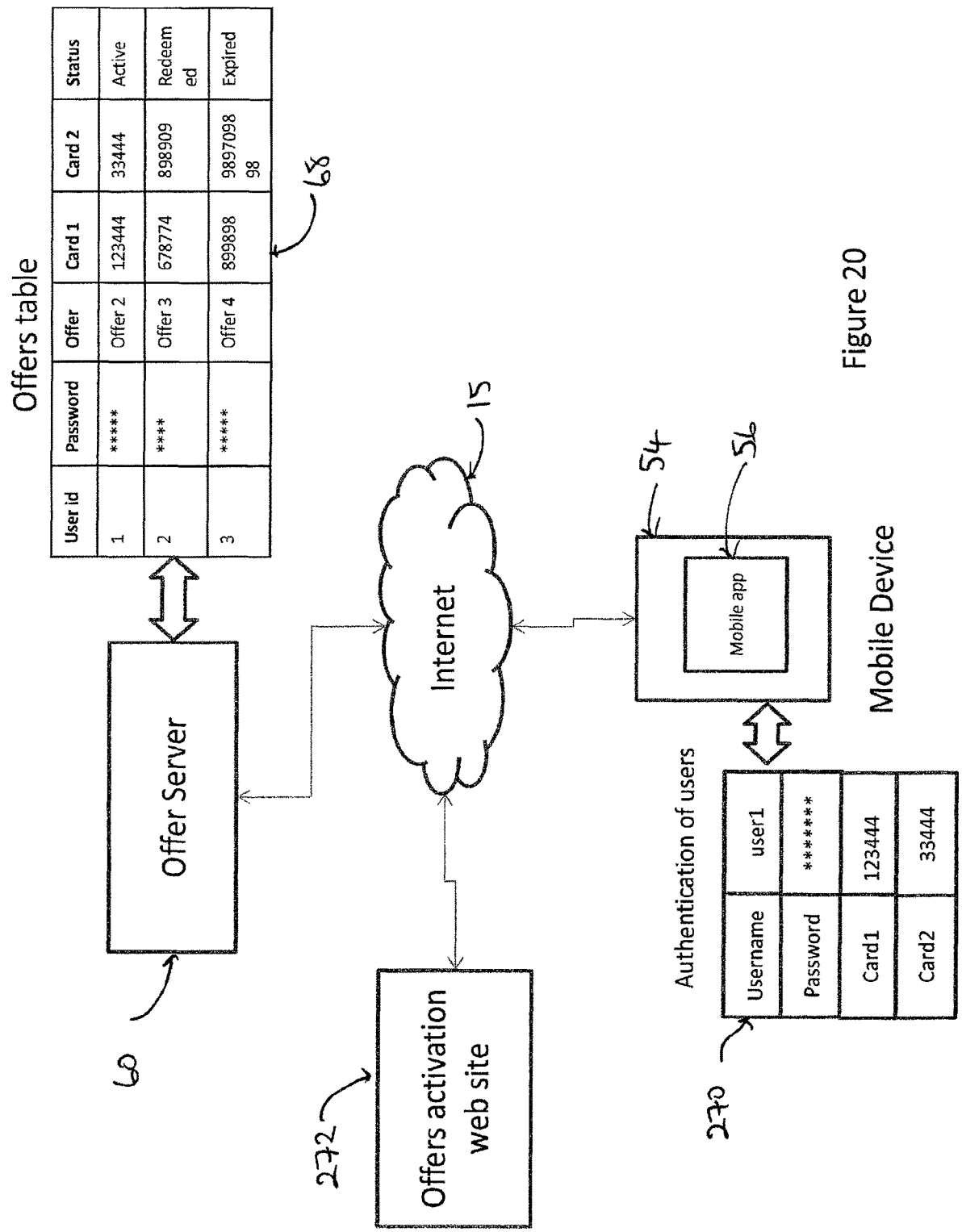
FIG. 20 shows an offer activation process in accordance with an embodiment of the present invention.

Activation of the offer is described below in relation to a mobile application 56 on a mobile device 54, in relation to a website and in relation to a normal landline phone.

a) Mobile application: As shown in FIG. 20, the system works as follows:
   a. The system comprise a mobile device 54 having a mobile application 56 thereon, an offer server 60 connected via the internet 15.
   b. Customers download the mobile application 56 to their mobile device 54, and use a combination of username and password 270 to sign-up
   c. The sign-up is the process through which the offer server 60 creates a new entry for this customer, storing a unique identifier of this customer (for example, a username), and his credentials (for example, a password), payment cards or any card associated with user (for example, loyalty cards)
   d. Offer activation is the process through which an offer is added to the customers offers table 68
   e. Through a mobile application, customers can receive an offer in the app, and by clicking on it, causes the application to associate this offer with the customer, and all his cards in table 68 b) Web-site: instead of using a mobile application, an offers activation web site 272 can be set such that customers can log into the site, consult offers, and activate offers they value.
   a. Website signs-up the customers in the same way as the mobile application above
   b. Website contacts the offer server 60 to add a new entry in offers table 68
   c. The website may not have offers to be browsed, and may simply provide an interface for users to key in offers, received from other mediums (print for example), and associate them with their cards after sign-up d. For example, in magazines and print media, offers normally come with a unique offer identifier associated with them, and customer can log into the website, activate the offers by keying in the offer identifier.

c) Phone: same as above, a phone interface can be used to interface with an interactive response machine over the phone, where customers can sign-up, and access their accounts.

a. Similar to both methods above, an early sign-up process creates an entry into the offers table 68 b. Offer activation associates this customers with offers at hand by asking customers to key in the identifier of the offer 2. Offer Redemption In the offer redemption process, once the offer is linked to a given card, the user can go and shop in any retailer. The process of redeeming the offer is challenging because:

1. POS software is not aware of any payment card data used. Normally this is handled by a separate software, often developed by separate company to the one that developed the POS software
2. POS software do not expose a way to get basket contents in a universal way
3. Offers are contingent on a number of conditions that can be verified only when they have access to basket data (for example: an offer on "a two for one offer on a given product" is valid only if the customer bought more than two of that particular product)

Figure 21:
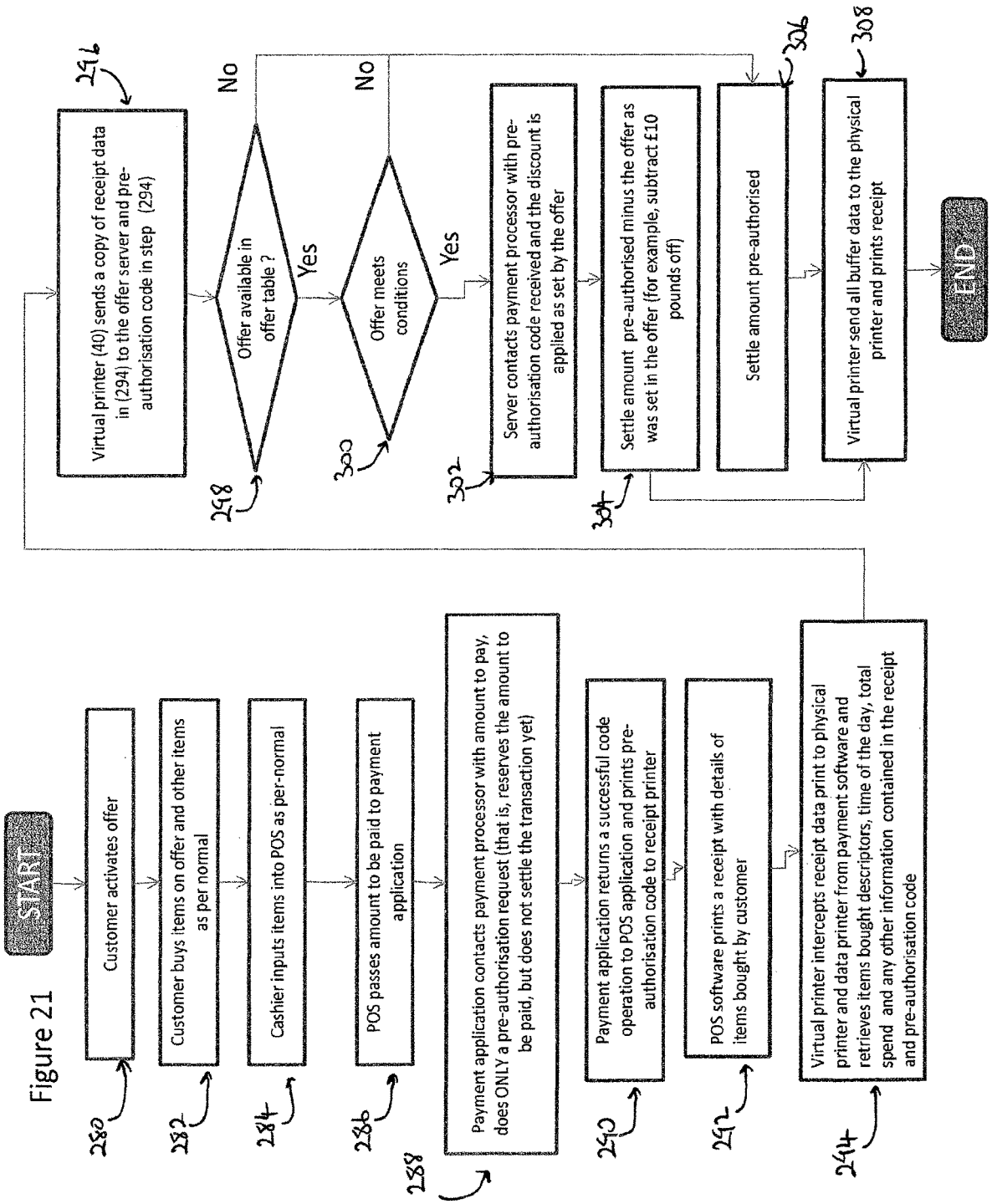
FIG. 21 shows a checkout process in accordance with an embodiment of the present invention.

The present invention solves these challenges as follows as shown in FIG. 21. It is noted that the virtual printer referred to in steps 7 to 9 of FIG. 21 is the virtual driver module 40 described in relation to FIGS. 2 and 3. With this arrangement, a number of offers become possible:

1. Time-based value-changing offers: where the value of the offer changes as a function of time. For example, an offer can be set where there is higher value if the customer acts on it now and lower if they choose to redeem at a later time
2. Offers based on complex conditions: for example, a retailer or manufacturer can set a campaign to give discounts to customers who use a given product for a given frequency. For example, a manufacturer can run an offer to give a 50% discount to anyone using their product once a month for a period of 12 months.

Digital Receipts

This embodiment of the present invention presents a method that allows customer to convert paper based receipts to digital receipts, organise their receipts in a central repository, and enroll to cross-retailer's loyalty and reward schemes where they can win points and be presented with personalised offers.

Figure 1:
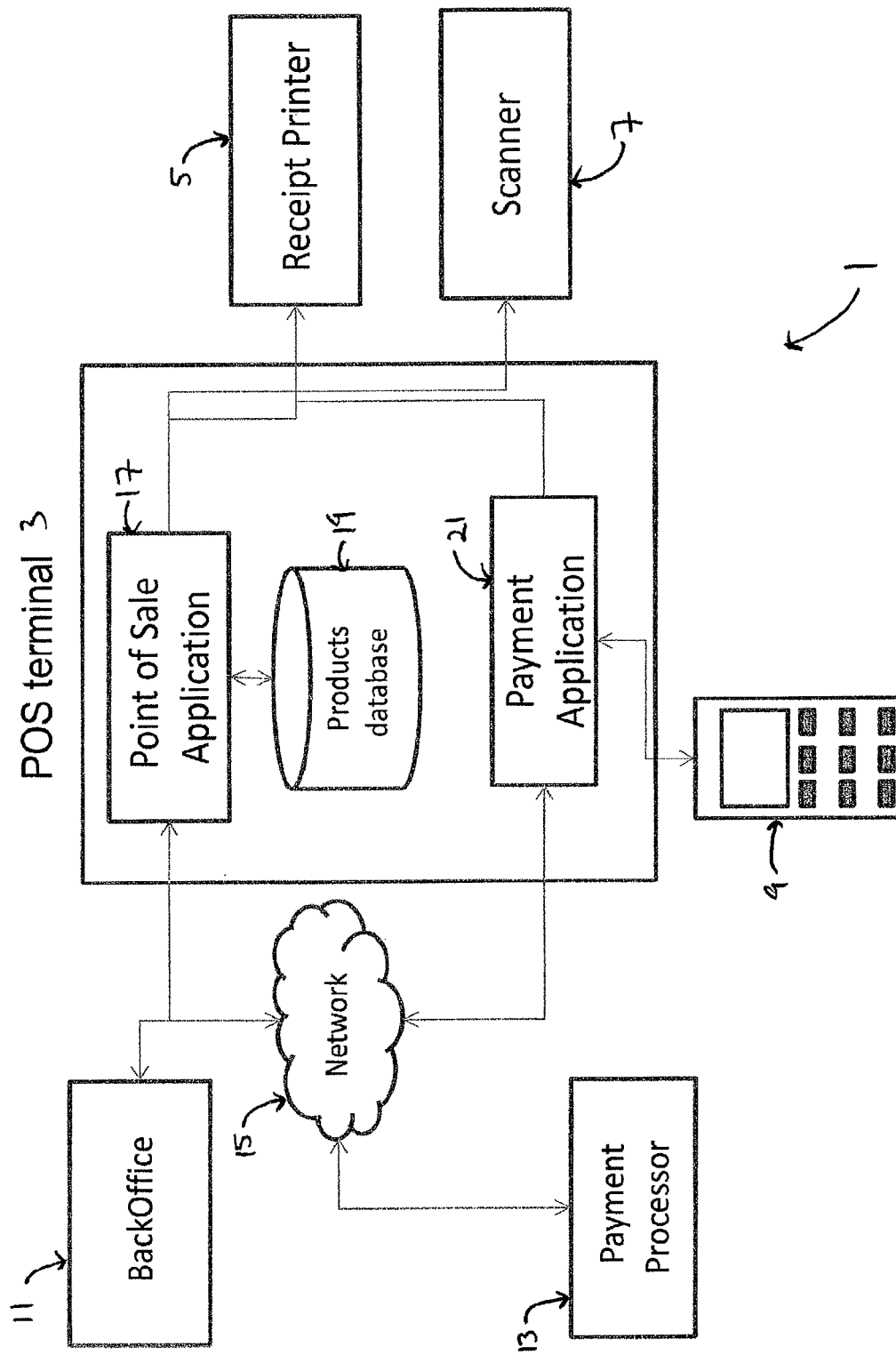
FIG. 1 shows a known point-of-sale (POS) till configuration.

A typical Point of Sale (POS) terminal 3 is shown in FIG. 1. The POS terminal 3 can be setup as per FIG. 3 to send copies of receipts 52 printed to the customers to a back office server 11.

The conversion of a paper receipt printer is done in two steps:

1. Receipt Data Encoding: in which data in the receipt is encoded into a format that can be easily later decoded by the customer
2. Receipt Data Decoding: in which data in step 1) is decoded into original format, reproducing the same contents as in paper receipt 1. Receipt Data Encoding:

Receipt data is encoded as shown in process in FIG. 10. FIG. 5 shows the result of the encoding in FIG. 10 in case the QR code is used as the 2D Bar code.

2. Receipt Data Decoding:

The conversion is achieved using any device with a camera (for example, a mobile device with a camera). FIG. 4 shows the decoding of the receipt data into a digital format.

Figure 22:
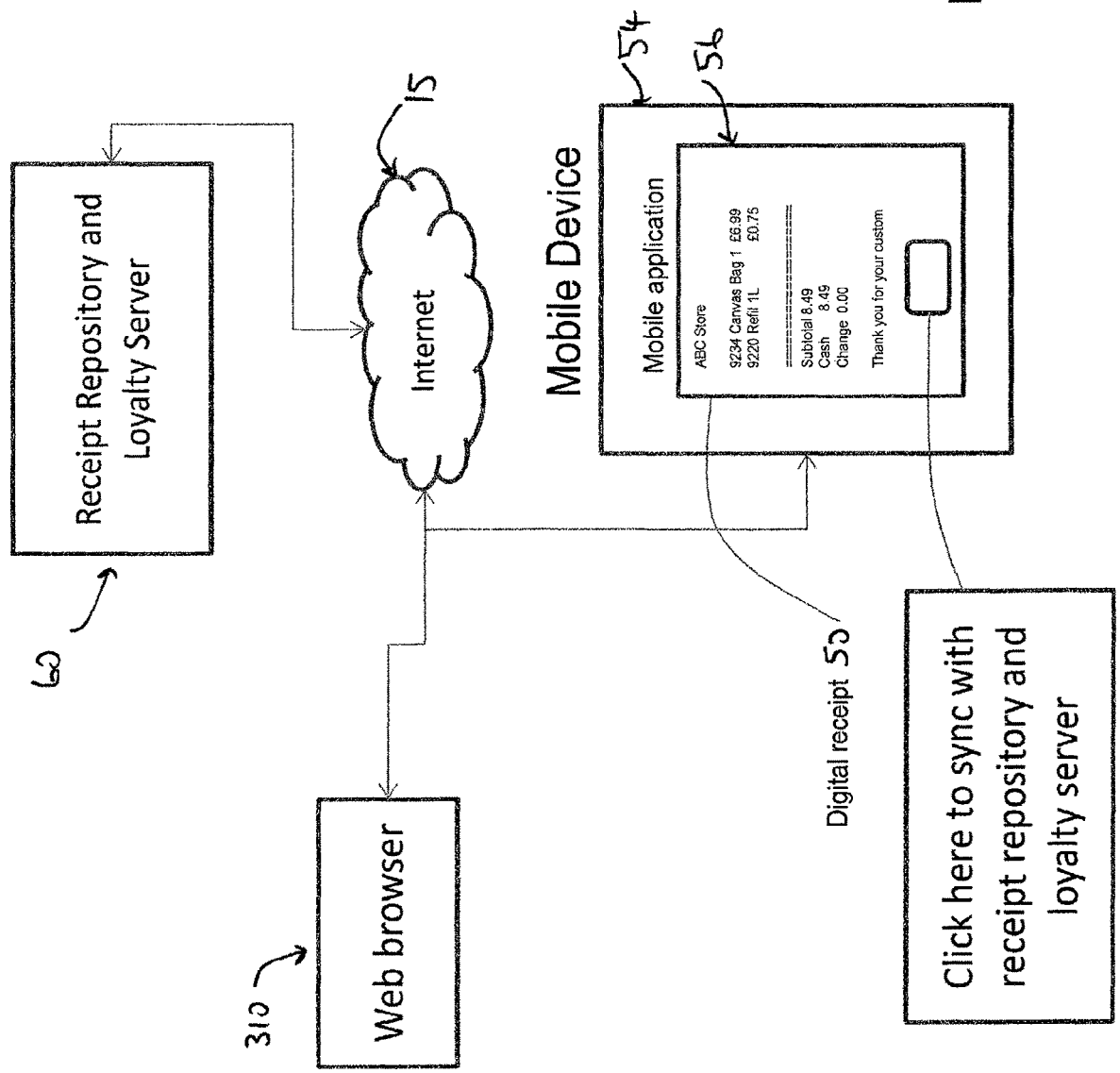
FIG. 22 shows a mobile device a remote server.

1. Any bar code that is easily decoded by a mobile device can be used instead of a QR (for example 1D bar codes, PDF417 or Maxi Code)
2. Instead of printing the 2D bar code on the receipt, data buffered in 132 can be sent to the customer mobile device using near-field communication (NFC), Bluetooth, infra-red or any communication means supported by the mobile device and the POS terminal
3. In case where it is preferred that the 2D bar-code is to be kept small, buffered data in 132 of FIG. 10 can be compressed before printed to the receipt or sent to the customer mobile device. Decoding this data first decompresses the data before recovering the original data
4. Digital receipts 52 can be organised within the mobile device, but as the customer accumulates more of these digital receipts, the customer can sign-up to a service allowing him or her to synchronise all his receipts with a receipt repository and loyalty server 60. User provides a username and password and upon synchronisation can access the service from their mobile or through a web browser 310 see FIG. 22.
5. Digital receipts 52 data integrity is achieved using process in FIG. 14.

Figure 23:
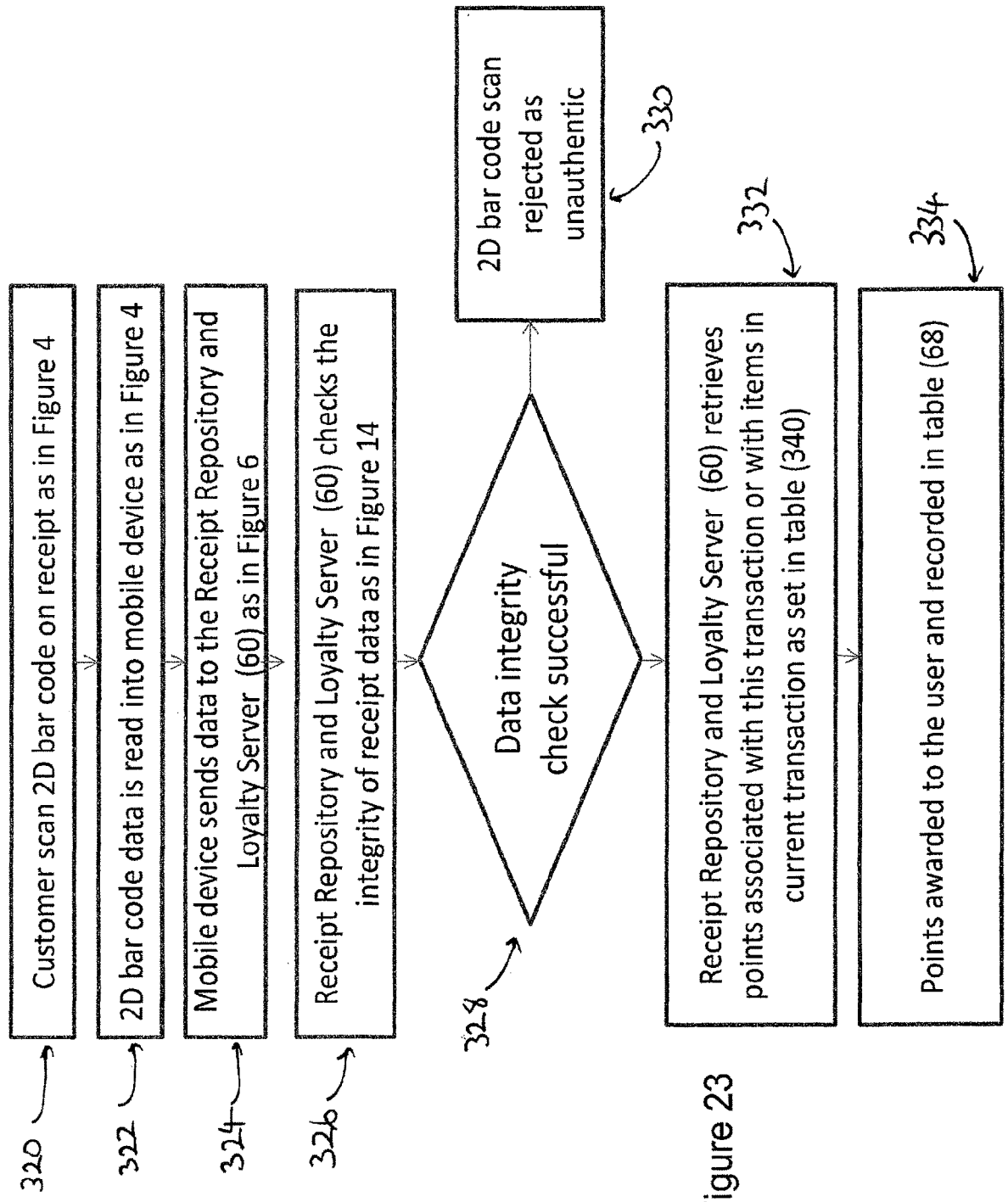
FIG. 23 shows a point award process in accordance with an embodiment of the present invention.
Figure 25:
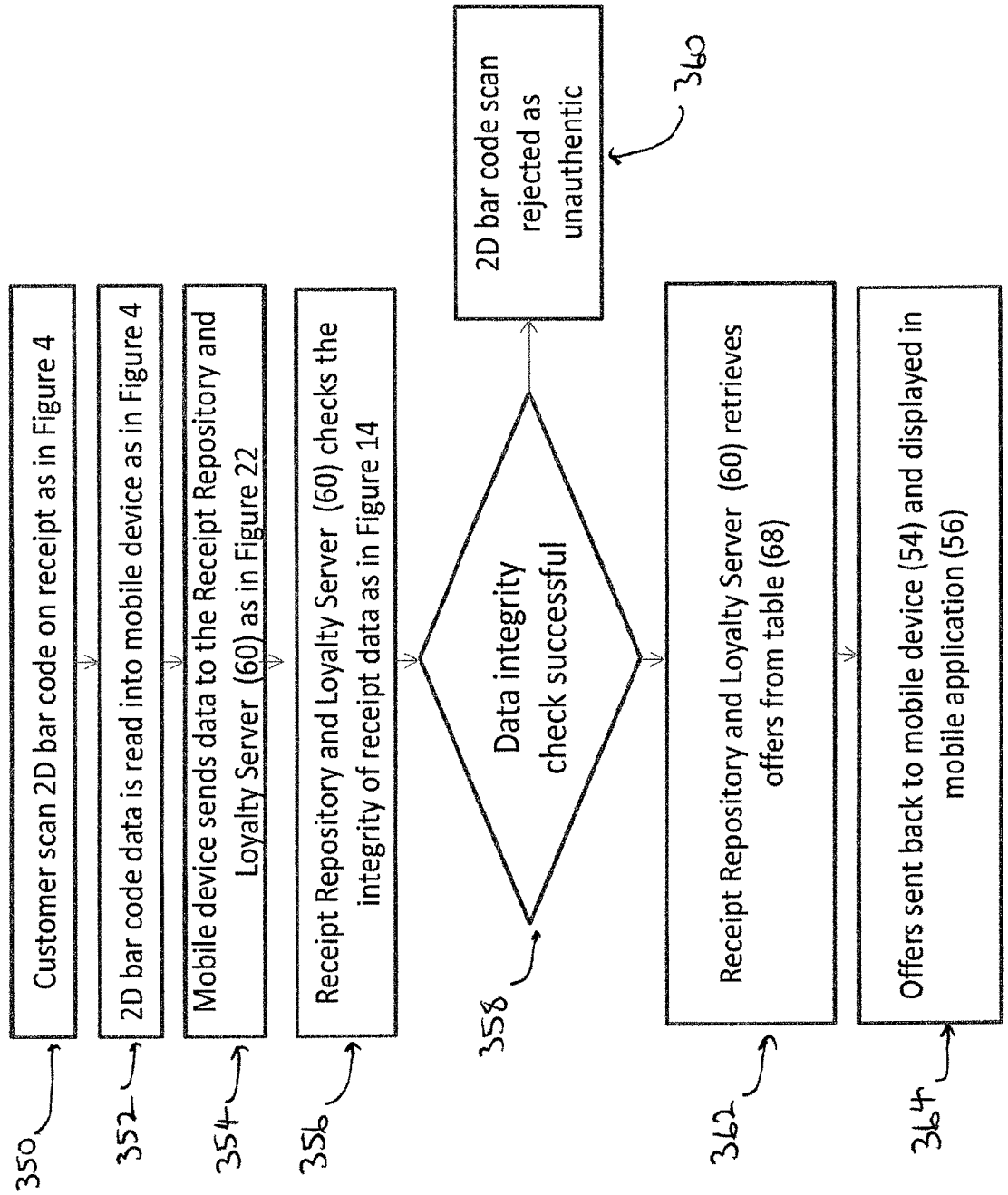
FIG. 25 shows a method of retrieving offers in accordance with an embodiment of the present invention.

Based on the receipt data encoding and receipt data decoding processes above, a multi-store, cross-retailer loyalty scheme is devised as follows:

1. As shown in FIG. 7, a sign-up process elicits customer profile information
2. Receipt repository and loyalty server creates an entry per customer as in 68. This entry keeps track of all customers purchase history, points rewarded and offers available to this customer.
3. The table in 68 is updated each time the customer scans a 2D bar-code embedded in a receipt
4. Points are rewarded via the process shown in FIG. 23.
5. Retailers points rules 340 can be as simple as assigning a fixed number of points to all retailers. It can also be sophisticated setup such that points depend on retailers and for each retailer, on items bought or any other criteria set by the retailer, see FIG. 24.
6. Offers are served as shown in FIG. 25. Offers can be rewarded based total points, frequency of purchase, store, customer profile, historical data or any combination thereof.

Questionnaire

A typical configuration of the point of sales according to the present embodiment of the invention is shown in FIG. 3. A point of sale software 17 runs alongside a payment software 21 on a Point of Sale (POS) till (3). The POS till can be attached with a Pin Pad 9 to process payment. Payments are settled by the Payment Software 21 with the help of a remote Payment Processor 13, usually reachable through the internet 15. Details of sales and receipts are logged remotely to a central storage server 11 via the operation of the virtual driver module 40.

Each customer is provided with a sales receipt printer through the receipt printer 5.

In some other configuration (mostly in restaurants), the Pin Pad 9 is a stand-alone machine connected directly to the payment processor 13 through the internet 15. The payment software 21 is run within the Pin Pad 9. The Pin Pad in this case has its own receipt printer.

Customers' feedback may be obtained by the following process:

The process is as follows (Process 1):
1. Point of sales software 17 generates transaction data to be printed to the receipt printer 5
2. Point of sales software 17 generates a unique identifier for this transaction
3. Point of sales software 17 generates a customer unique identifier. The customer unique identifier could be loyalty card number, payment card number a derivative of it (for example a secure hash of a credit card number used in payment)
4. Results of (1), (2) and (3) are embedded in a 2D bar code and printed to a receipt printer 5
5. Customers using this mobile device 54, running a mobile application 56 is prompted to scan the 2D bar code printed on the paper receipt 52 see FIG. 6.
6. Mobile application 56 running on customer mobile device 54 sends data in (4) to a central customer experience management server 60
7. A questionnaire 62 is shown on the mobile application 56 and customers can fill it by interacting with the application
8. Customer submits questionnaire to a customer experience management server 60
9. Instead of encoding the data, same effect can be achieved using technology that allows mobile devices to receive data. Such technology include Near Filed Communication (NFC), Bluetooth, infra-red and so on.

Voucher Distribution and Redemption System

This embodiment of the present invention comprises a central storage location that holds a public key associated with each user who is registered with the system. The central storage location further stores an encrypted version of the user's private key and data that is used to uniquely identify the user during receipt download. The central storage location has inputs/outputs arranged to be able to communicate with point of sale terminals in stores and with a user application running on a user terminal.

The central storage location is arranged to be in communication with POS terminals as part of a transaction process and to supply the public key to the POS terminal on request to allow receipt data to be encrypted for subsequent storage at the central location.

Users may access receipt data via the user application at any time by first identifying themselves to the central storage location and then subsequently downloading the encrypted private key and encrypted receipt data for decryption by the user application.

Preferably, the private key is hashed with a user held password before storage on the central storage location. This conveniently enables the user to decrypt the private key when required by entering their password in the user application which can then be hashed and used to decrypt the private key.

Figure 26:
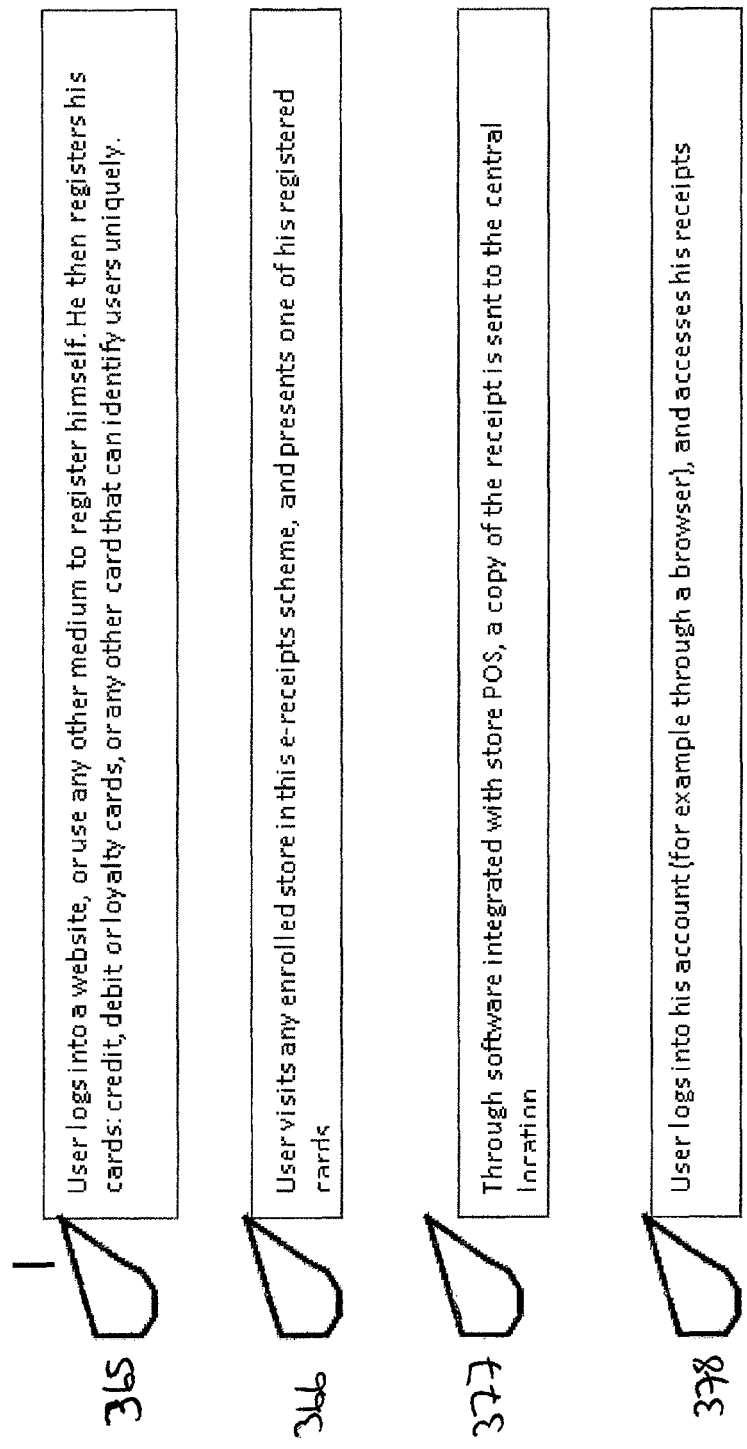
FIG. 26 shows a known e-receipts solution.

Known arrangements that store receipts at a central location (see FIG. 26) suffer from problems such as,
1. They expose all the purchasing history of a user to the central storage location. As the storage location is often managed by a third-party (i.e. an entity that is not either the store issuing the receipt nor the user), this is likely to be seen as invasion to a user's privacy.
2. They expose sales data of all participating stores to the third-party responsible for managing the central receipts data. This is unacceptable to many stores as they regard their sales details as embodying important intelligence information.

The embodiment of the present invention preserves customer privacy relating to their purchases and also makes the archiving of secure receipts automatic without requiring users' interaction, in effect addressing the two shortcomings noted above. In embodiments of the present invention, receipt data is kept private and only users can access it. The third party who manages the central storage facility (for storing all receipts data) cannot access its contents.

This embodiment of the present invention also introduces a completely electronic way of generating and redeeming vouchers and coupons. It is both cost-efficient and dynamic thereby allowing stores to reach to their clients frequently.

The first part of the solution addresses shortcomings (1) and (2) discussed above.

Figure 27:
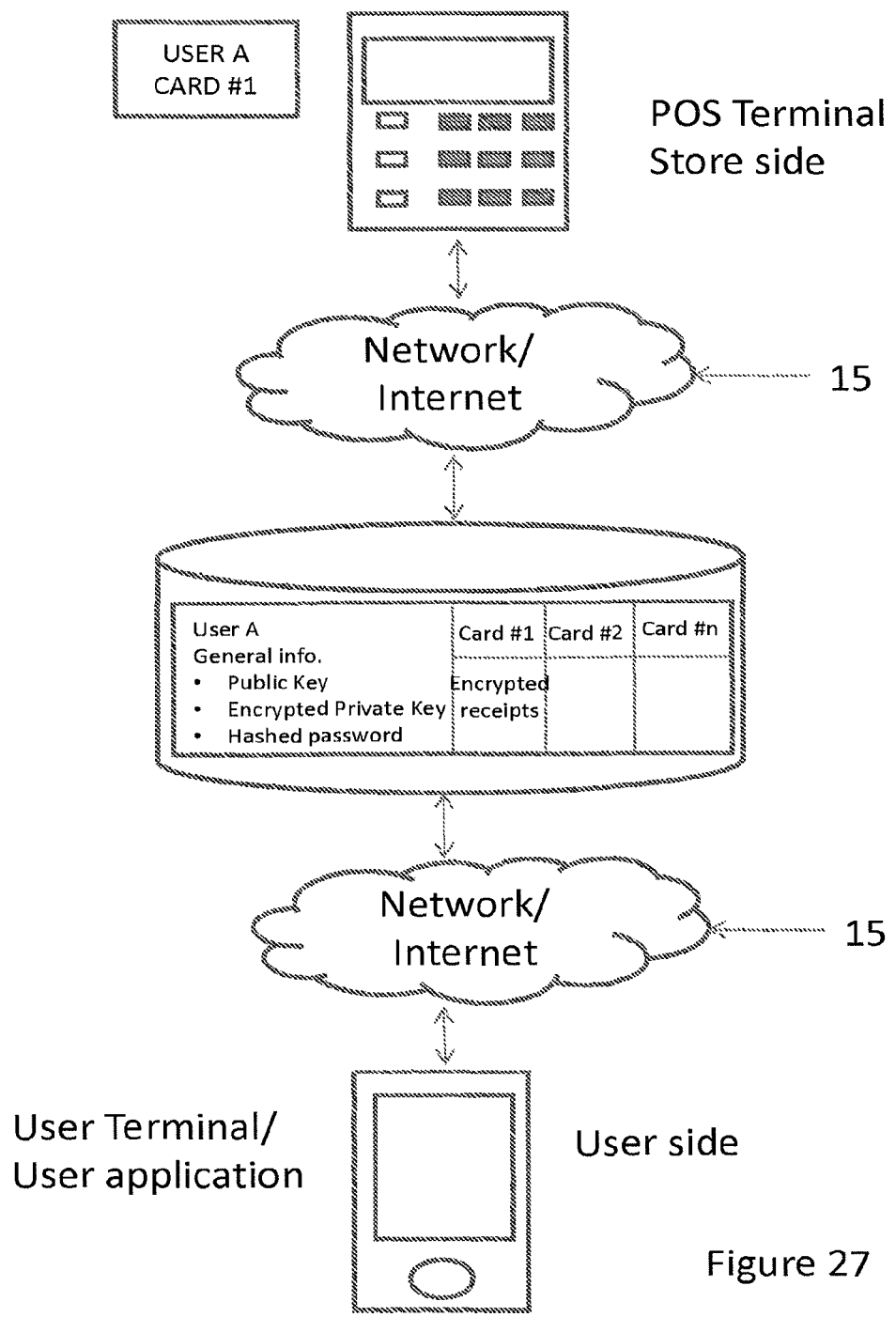
FIG. 27 shows an electronic receipt system in accordance with an embodiment of the present invention.

An overview of the system components is shown in FIG. 27. Operation of the system is described below in conjunction with FIGS. 27 and 28.

Store Side: On the store side 370, the present invention works as follows:
1. Software (virtual driver module 40) is installed in each Point of Sale (POS) terminal 3 that makes it possible to send customer receipts to a central storage database 60.
2. The software integrates with the POS terminal 3 such that upon a customer transaction:
   a. The POS terminal 3 establishes a secure channel with the central storage location 60 and requests a public key associated with the card currently used to pay for the purchase; and
   b. Once the public key is received at the POS terminal 3, receipt data is encrypted using this public key and sent through the secure channel established in a) to the central storage location 60.

Figure 28:
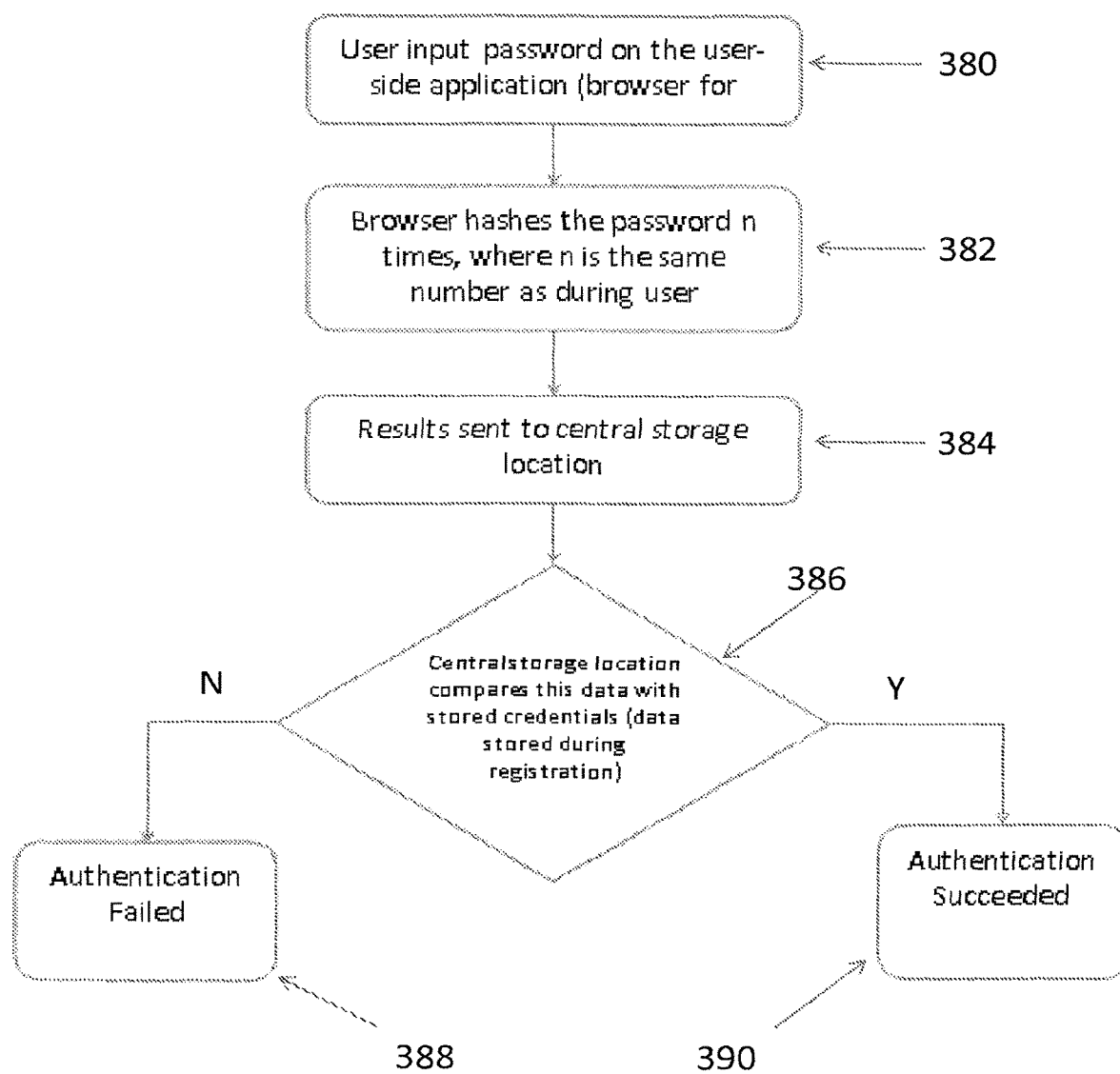
FIG. 28 depicts the process of user authentication.

User (customer) side: On the user side 372, users need to sign-up before accessing their receipts. The sign-up process is as follows:
1. The user can sign up (380) to use electronic receipts through any interface that allows her/him to access the central storage (example, web browser, smartphone application, desktop application etc.);
2. The user chooses an identifier (for example his email address) and a password to authenticate himself;
3. The user then registers any of the cards she/he holds that she/he wants to use with the electronic receipt system. These cards are used to identify the user at the POS terminal in stores;
4. Once the user is successfully registered, a private/public key is generated by the user application (web browser, smartphone application, desktop application). The public key generated in this step is later used to secure all the receipts generated at the POS terminal during a store side transaction;
5. The public key is sent to the central storage location. This public key is the one served to the POS terminal in step 2a in the store side process described above;
6. The password is hashed (through a secure one-way function (SHA-2 for example)). This hash is used to derive a key. This key serves to encrypt the private key. The resulting encrypted private key data is sent to the central location. The private key will need to be retrieved later to decrypt receipt data. Since the private key is encrypted, the central storage location cannot access the private key of users or their receipt data;
7. The password is hashed a second time (or a number of times) (382). The result of this computation is sent to the central storage location (384). In the case when the client application is a web browser, this step is important to make sure that the user is authenticated from any web browser on any computer;
8. To authenticate users (386, 388, 390) (especially in the case of web browsers), users need to enter only a password from any computer with a web browser. The web browser then hashes the password two times, and compares it with the one stored in the central storage solution as shown in FIG. 28.

Once users are signed up, they can access their receipts electronically as follows:
1. The user inputs their password on the user-side application 56. If the authentication is successful, they proceed to step 2, otherwise the application warns the user of the failure and goes back to step 1;
2. The user side application authenticates the user as shown in FIG. 28;
3. The user-side application downloads the encrypted private key from the central storage location;
4. The input password in step 1) is then hashed once, and used to decrypt the private key. Once that's done, the private key is stored at the user-side application for as long as it is needed;
5. The user registered cards are used then to retrieve receipts associated with this user. Once the user receipts are downloaded locally, the private key is used to decrypt the receipt data which is then displayed in plain text to the user.

The net effect of this process is that only the user and the stores have access to the receipt data throughout the lifetime of the application.

Figure 29:
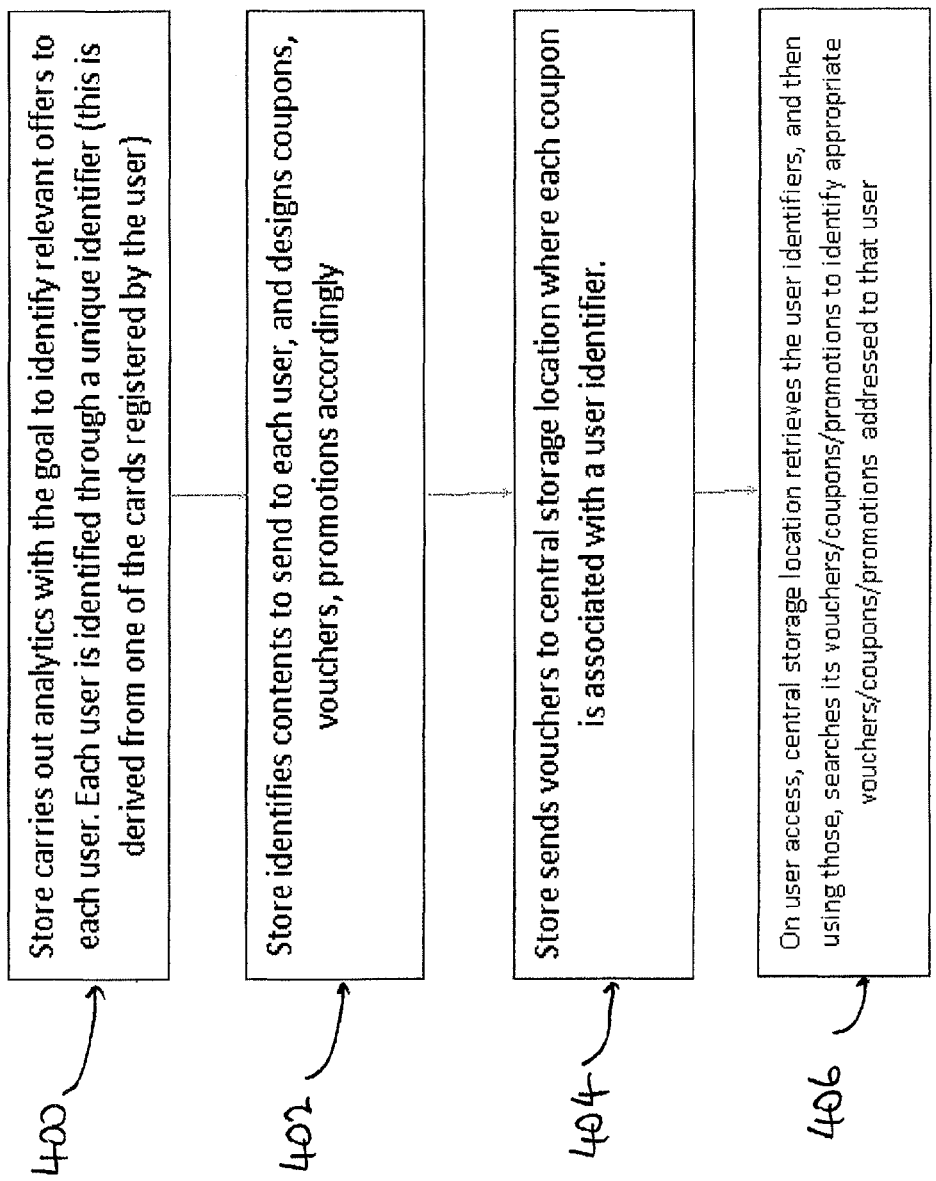
FIG. 29 shows the process of voucher/coupon creation.

Typically, stores have access to all users' purchases and through analysing these data, they can identify relevant offers to each user. Stores can use the system described above to send users relevant offers as shown in FIG. 29.

Figure 30:
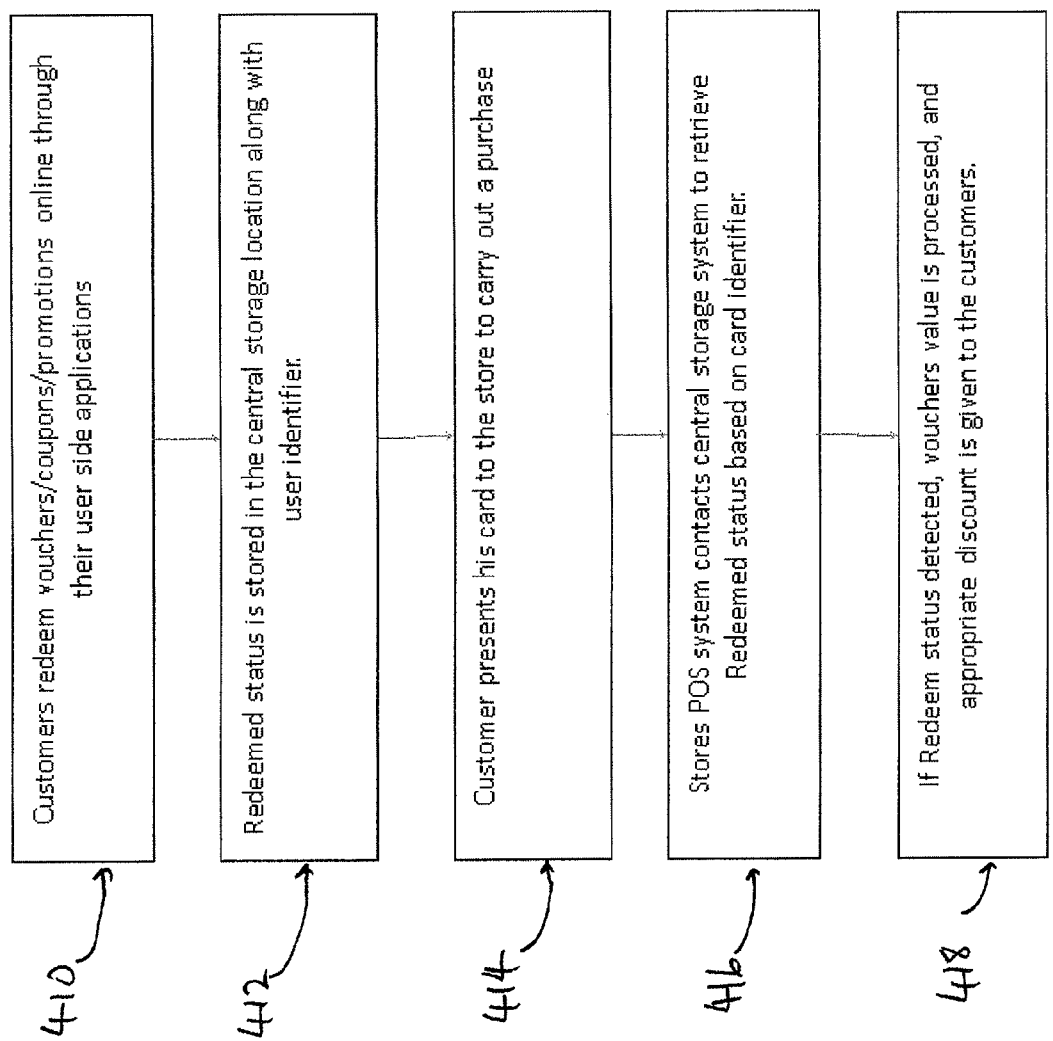
FIG. 30 shows the process of voucher/coupon redemption.

Users can redeem their vouchers, coupons, and promotion online. There is no need to print anything. A voucher/promotion/offer can be redeemed online as shown in FIG. 30.

It will be understood that the embodiments described above are given by way of example only and are not intended to limit the invention. It will also be understood that the embodiments described may be used individually or in combination.

What is claimed is:

1. A method of operating a point-of-sale (POS) system, the POS system comprising a POS terminal having a software module for enabling a retailer to process transactions within a transaction environment, and peripheral devices in communication with the POS terminal, the POS system further comprising a driver software module, the method comprising:
   receiving, at the driver software module, data sent between the software module and a first peripheral device in communication with the POS terminal, the received data comprising transaction data;
   communicating with a further device in dependence on the data received at the driver software module and sending the transaction data to the further device, the transaction data to be used by the further device to generate modified data;
   receiving, at the driver software module, the modified data from the further device; and
   outputting the modified data received at the driver software module to at least one of the software module and a second peripheral device.

2. A method as claimed in claim 1 wherein the POS terminal software module comprises a point of sale application software module.

3. A method as claimed in claim 2, wherein the point of sale application software module is in communication with a database comprising details of transaction items.

4. A method as claimed in claim 1, wherein the POS terminal software module comprises a payment application software module and the data received at the driver software module comprises payment data related to transactions processed by the POS system.

5. A method as claimed in claim 1, wherein the communicating step comprises the driver software module sending the data received in the first receiving step or a portion thereof to the further device.

6. A method as claimed in claim 1, wherein the driver software module receives data formatted to requirements of a peripheral device from the POS terminal.

7. A method as claimed in claim 1, wherein the modified data received from the further device is formatted to requirements of the second peripheral device.

8. A method as claimed in claim 1, wherein the further device is a remotely located server.

9. A method as claimed in claim 1, wherein the first peripheral device comprises a scanner.

10. A method as claimed in claim 1, wherein the second peripheral device comprises a printer.

11. A method as claimed in claim 1, wherein the modified data comprises at least a portion of the transaction data received from the POS terminal and additional data generated by the further device, the modified data being output to a printer.

12. A method as claimed in claim 11, wherein the modified data is output to the printer by at least one of the driver software module, the software module, and a printer driver.

13. A method as claimed in claim 11, wherein the modified data comprises a barcode that comprises a copy of transaction data.

14. A method as claimed in claim 11, wherein the modified data comprises a barcode that comprises an identifier for retrieving a copy of transaction data from a transaction server.

15. A method as claimed in claim 11, wherein the modified data comprises a barcode that comprises an identifier for retrieving a questionnaire for completion by a consumer.

16. A method as claimed in claim 1, wherein the modified data comprises receipt data for printing by a printer.

17. A method as claimed in claim 1, wherein the driver software module receives transaction item data from the software module, the transaction item data concerning transaction items scanned using the first peripheral device, wherein the first peripheral device is a scanner.

18. A method as claimed in claim 1, wherein the POS terminal comprises a software stack and wherein the driver software module is installed within the software stack.

19. A method as claimed in claim 1, wherein the driver software module is an application programming interface (API).

20. A method as claimed in claim 1, wherein the driver software module comprises an application programming interface (API) hook.

21. A method as claimed in claim 1, wherein the modified data is output to the second peripheral device by the driver software module formatted to requirements of the second peripheral device, and wherein the second peripheral device is a printer device.

22. A method as claimed in claim 1, wherein the driver module comprises a data parser module.

23. A point-of-sale (POS) terminal comprising:
a computer processor;
a software module for enabling a retailer to process transactions within a transaction environment, the POS terminal being in communication with peripheral devices;
a driver software module,
wherein the driver software module is arranged to:
receive transaction data comprising data sent between the software module and a first peripheral device in communication with the POS terminal;
communicate with a further device in dependence on the data received at the driver software module and send the transaction data to the further device, the transaction data to be used to generate modified data by the further device;
receive the modified data from the further device; and
output the received modified data to one or more of the software module and a second peripheral device.

24. The POS terminal of claim 23, wherein the POS terminal comprises a point of sale application software module in communication with a database comprising details of transaction items.

25. The POS terminal of claim 23, wherein the POS terminal comprises a payment application software module and the data received at the driver software module comprises payment data related to transactions processed by the POS terminal.

26. The POS terminal of claim 23, wherein the further device is a remotely located server.

27. The POS terminal of claim 23, wherein the first peripheral device comprises a scanner.

28. The POS terminal of claim 23, wherein the second peripheral device comprises a printer.

29. The POS terminal of claim 28, wherein the modified data received from the further device is formatted to the requirements of the second peripheral device.

30. The POS terminal of claim 23, wherein the modified data comprises at least a portion of the transaction data and additional data generated by the further device, the modified data being output to a printer.

31. The POS terminal of claim 30, wherein the modified data comprises receipt data for printing by the printer.

32. The POS terminal of claim 23, wherein the driver software module comprises an application programming interface (API).

33. The POS terminal of claim 23, wherein the POS terminal comprises a software stack and wherein the driver software module is installed within the software stack.

34. The POS terminal of claim 23, wherein the modified data is output by at least one of the driver software module, the software module, and a printer driver.

35. The POS terminal of claim 23, wherein the modified data is output to the second peripheral device by the driver software module formatted to requirements of the second peripheral device, and wherein the second peripheral device is a printer device.

* * * * *